(12) United States Patent
Uejima et al.

(10) Patent No.: US 8,647,507 B2
(45) Date of Patent: Feb. 11, 2014

(54) MEMBRANE CARTRIDGE

(75) Inventors: Tatsuya Uejima, Amagasaki (JP);
Yoshio Matsuzaki, Amagasaki (JP);
Tomohiko Sasaki, Amagasaki (JP);
Kimihiro Ishikawa, Amagasaki (JP)

(73) Assignee: Kubota Corporation, Osaka (JP)

( * ) Notice: Subject to any disclaimer, the term of this patent is extended or adjusted under 35 U.S.C. 154(b) by 129 days.

(21) Appl. No.: 12/734,882

(22) PCT Filed: Nov. 27, 2008

(86) PCT No.: PCT/JP2008/003486
§ 371 (c)(1),
(2), (4) Date: May 28, 2010

(87) PCT Pub. No.: WO2009/069295
PCT Pub. Date: Jun. 4, 2009

(65) Prior Publication Data
US 2010/0300955 A1    Dec. 2, 2010

(30) Foreign Application Priority Data
Nov. 28, 2007  (JP) .................. 2007-307654

(51) Int. Cl.
*B01D 63/08*  (2006.01)
*B01D 63/00*  (2006.01)
(52) U.S. Cl.
USPC ............. 210/321.84; 210/321.6; 210/321.75

(58) Field of Classification Search
USPC ................ 210/232, 321.6, 321.75, 321.84
See application file for complete search history.

(56) References Cited

U.S. PATENT DOCUMENTS

2005/0123727 A1    6/2005  Hester et al. ........... 428/188

FOREIGN PATENT DOCUMENTS

| EP | 0 602 560 A1 | 6/1994 | ............ B01D 63/08 |
| JP | 06-210142 | 8/1994 | ............ B01D 63/08 |
| JP | 07-185269 | 7/1995 | ............ B01D 63/16 |
| JP | 08-206474 | 8/1996 | ............ B01D 65/08 |
| JP | 09-122457 | 5/1997 | ............ B01D 63/08 |
| JP | 2006-043631 | 2/2006 | ............ B01D 63/08 |

OTHER PUBLICATIONS

Int'l Search Report from corresponding Int'l Patent Application No. PCT/JP2008/003486, 3 Pages.
Supplementary European Search Report from corresponding European Patent Application No. EP 08 85 4657, 2 Pages.

*Primary Examiner* — John Kim
(74) *Attorney, Agent, or Firm* — Kusner & Jaffe

(57) ABSTRACT

Disclosed is a membrane cartridge used in a submerged membrane separator. A peripheral portion of a filtration membrane is joined to the surface of a filtration plate. A portion higher than the surface of the filtration plate corresponding to the peripheral edge of the filtration membrane is formed on the surface of the filtration plate further on the outer side than the peripheral edge of the filtration membrane.

7 Claims, 26 Drawing Sheets

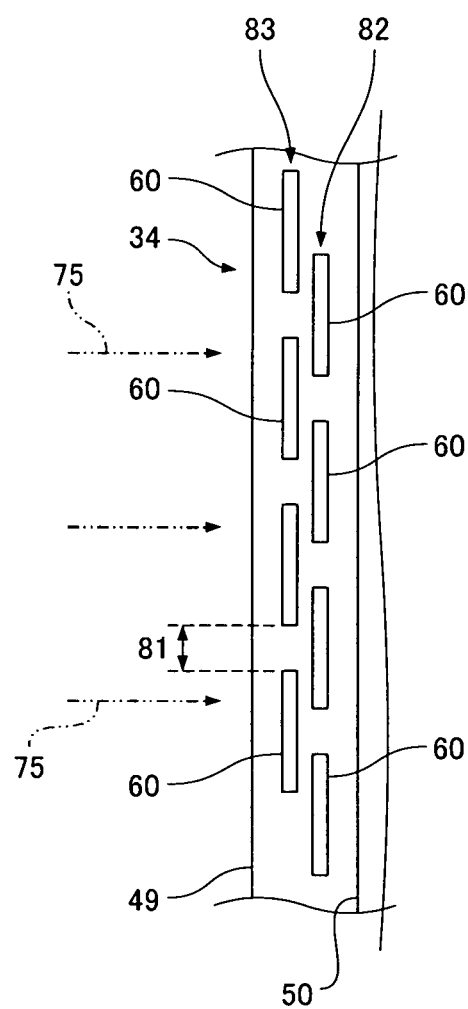

MEMBRANE CARTRIDGE

TECHNICAL FIELD

The present invention relates to a membrane cartridge used in a submerged membrane separator.

BACKGROUND ART

Conventionally, as the membrane cartridge of this type, for example as shown in FIG. 27, a filtration membrane 3 is arranged on the surface of a filtration plate 2 having a square flat plate shape and the peripheral portion of the filtration membrane 3 is welded over the entire periphery of the surface of the filtration plate 2. The welded portion 12 is formed in a position slightly inward from a peripheral edge 3a of the filtration membrane 3. A range from the welded portion 12 of the filtration membrane 3 to the peripheral edge 3a is an un-joined portion 13 that is not welded.

A water intake nozzle 5 for sucking treated water obtained by membrane filtration is provided at the upper end of the filtration plate 2. A membrane cartridge 4 having the configuration as mentioned above is described in, for example, Japanese Patent No. 3010979. The membrane cartridge 4 has, in addition to the welded portion 12, intermittent welded portions formed by intermittently welding the peripheral edge 3a of the filtration membrane 3.

FIG. 28 shows a submerged membrane separator 6 including the membrane cartridge 4. This submerged membrane separator 6 is submerged in a treatment tank filled with activated sludge and separates activated sludge and treated water. A plurality of the membrane cartridges 4 are detachably stored in a box-type casing 7 opened at the top and the bottom in a state in which the membrane cartridges 4 are arrayed in parallel at predetermined intervals. An air diffuser 8 is provided below the membrane cartridges 4.

A water collecting pipe 10 for collecting the treated water is provided on one side of an upper opening 9 of the casing 7. The water collecting pipe 10 and water intake nozzles 5 of the membrane cartridges 4 are connected via connection pipes 11.

Consequently, during filtration operation, the inner sides of the membrane cartridges 4 are decompressed while air diffusion is performed from the air diffuser 8, whereby sludge or the like in liquid to be treated is caught by filtration membranes 3 of the membrane cartridges 4. Permeate permeating through the filtration membranes 3 and flowing into the inner sides of the cartridges 4 is discharged as treated water 14 to the water collecting pipe 10 from the water intake nozzles 5 through the connection pipes 11.

In this case, upflow is caused between the membrane cartridges 4 by air bubbles of the air diffused from the air diffuser 8. The matter adhering to the membrane surface of the membrane cartridges 4 is removed by this upflow.

In some case, for example, when properties of the liquid to be treated are deteriorated, the sludge clogs in spaces between the membrane cartridges 4 and the membrane surfaces of the membrane cartridges 4 are blocked. When such blocking of the membrane surfaces occurs, after stopping the air diffusion by the air diffuser 8, stopping the filtration operation is stopped, and draining the liquid to be treated in the treatment tank, as shown in FIG. 29, an operator jets high-pressure cleaning liquid 15 to the spaces between the membrane cartridges 4 from the upper opening 9 of the casing 7. According to the jetting of the cleaning liquid 15, the sludge clogging the spaces between the membrane cartridges 4 is smashed and removed and the membrane surfaces of the membrane cartridges 4 are cleaned.

DISCLOSURE OF THE INVENTION

Problems to be Solved by the Invention

However, in the conventional form, when the high-pressure cleaning liquid 15 is jetted to the spaces between the membrane cartridges 4 from the upper opening 9 of the casing 7 as shown in FIG. 28 and FIG. 29, the cleaning liquid 15 directly hits against the upper end edge of the filtration membrane 3 as shown in FIG. 30A. Therefore, unfortunately, the un-joined portion 13 of the upper end edge of the filtration membrane 3 is turned up and, as shown in FIG. 30B, the upper end edge of the filtration membrane 3 peels from the filtration plate 2. Such a problem occurs as long as the filtration membrane 3 has the un-joined portion 13 even when the peripheral edge of the filtration membrane 3 is intermittently welded.

It is an object of the present invention to provide a membrane cartridge in which a filtration membrane can be prevented from being peeled by cleaning liquid when the cleaning liquid is jetted to clean the membrane cartridge.

Means for Solving the Problems

In order to attain the object, a first invention is a membrane cartridge used in a submerged membrane separator, wherein the peripheral portion of a filtration membrane is joined to the surface of a filtration plate, and a portion higher than the surface of the filtration plate corresponding to the peripheral edge of the filtration membrane is formed on the surface of the filtration plate further on the outer side than the peripheral edge of the filtration membrane.

Consequently, a plurality of the membrane cartridges are provided to be arrayed at predetermined intervals in a casing of the submerged membrane separator. When cleaning liquid is jetted to clean the membrane cartridges, the cleaning liquid is jetted from the side of one side of the filtration plate to spaces between the membrane cartridges. In this case, since the portion higher than the surface of the filtration plate corresponding to the peripheral edge of the filtration membrane functions as a screen (a wall) immediately before the peripheral portion of the filtration membrane, it is possible to prevent the cleaning liquid from directly hitting against the peripheral portion of the filtration membrane. Consequently, it is possible to prevent the peripheral portion of the filtration membrane from peeling from the filtration plate.

A second invention is the membrane cartridge, wherein a projecting portion higher than the surface of the filtration plate corresponding to the peripheral edge of the filtration membrane is formed on the surface of the filtration plate further on the outer side than the peripheral edge of the filtration membrane.

Consequently, when the cleaning liquid is jetted to clean the membrane cartridges, the cleaning liquid is jetted to the spaces between the membrane cartridges from the side of one side of the filtration plate. In this case, the cleaning liquid hits against the projecting portion immediately before the peripheral portion of the filtration membrane. It is possible to prevent the cleaning liquid from directly hitting against the peripheral portion of the filtration membrane. Consequently, it is possible to prevent the peripheral portion of the filtration membrane from peeling from the filtration plate.

A third invention is the membrane cartridge, wherein a projecting portion is continuously formed on the surface of the filtration plate.

A fourth invention is the membrane cartridge, wherein projecting portions are intermittently (discontinuously) formed on the surface of the filtration plate.

A fifth invention is the membrane cartridge, wherein a recess is formed on the surface of the filtration plate, and the peripheral edge of the filtration membrane is located in the recess.

Consequently, when the cleaning liquid is jetted to clean the membrane cartridges, the cleaning liquid is jetted to the spaces between the membrane cartridges from the side of one side of the filtration plate. In this case, since the peripheral edge of the filtration membrane enters the inside of the recess, it is possible to prevent the cleaning liquid from directly hitting against the peripheral portion of the filtration membrane. Consequently, it is possible to prevent the peripheral portion of the filtration membrane from peeling from the filtration plate.

A sixth invention is a flat membrane cartridge used in a submerged membrane separator, wherein a filtration membrane is provided on the surface of a filtration plate, an inclined surface is formed on the filtration plate, the inclined surface is inclined in a direction in which the thickness of the filtration plate decreases further in an outer side direction, and the peripheral portion of the filtration membrane is joined to the inclined surface.

Consequently, a plurality of the membrane cartridges are provided to be arrayed at predetermined intervals in a casing of the submerged membrane separator. When cleaning liquid is jetted to clean the membrane cartridges, the cleaning liquid is jetted to spaces between the membrane cartridges from the side of one side of the filtration plate. In this case, since the cleaning liquid hits against one side of the peripheral portion of the filtration membrane joined to the inclined surface of the filtration plate, the surface of the peripheral portion of the filtration membrane is subjected to a flow of the cleaning liquid and pressed against the inclined surface of the filtration plate. Consequently, it is possible to prevent the peripheral portion of the filtration membrane from peeling from the filtration plate.

Advantages of the Invention

As explained, according to the present invention, the portion higher than the surface of the filtration plate corresponding to the peripheral edge of the filtration membrane functions as the screen (the wall) immediately before the peripheral portion of the filtration membrane. Therefore, it is possible to prevent the cleaning liquid from directly hitting against the peripheral portion of the filtration membrane. Consequently, it is possible to prevent the peripheral portion of the filtration membrane from peeling from the filtration plate.

BRIEF DESCRIPTION OF THE DRAWINGS

FIG. 18A is an enlarged view of a peripheral portion of a membrane cartridge of a submerged membrane separator in a seventh embodiment of the present invention;

BEST MODE FOR CARRYING OUT THE INVENTION

A first embodiment in the present invention is explained below with reference to FIGS. 1 to 12.

Figure 1:
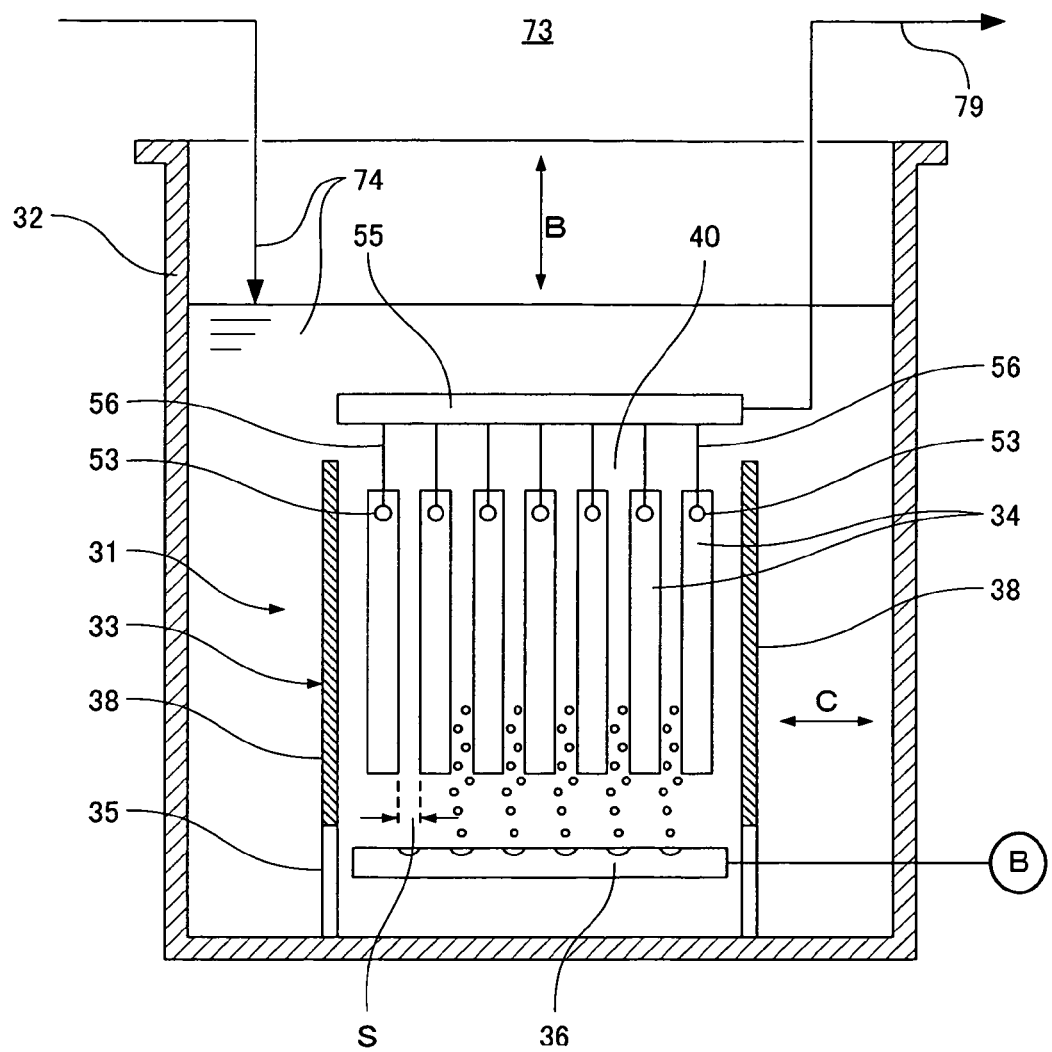
FIG. 1 is a schematic longitudinal sectional view showing the configuration of a submerged membrane separator in a first embodiment of the present invention.

As shown in FIG. 1, reference numeral 31 denotes a submerged membrane separator. This submerged membrane separator 31 is submerged in a treatment tank 32 filled with activated sludge and separates activated sludge and treated water. The submerged membrane separator 31 includes a box-type casing 33 for membranes opened at the top and the bottom, a plurality of flat membrane cartridges 34 arrayed in parallel to one another in this casing 33, and an air diffuser 36 provided below these membrane cartridges 34.

Figure 2:
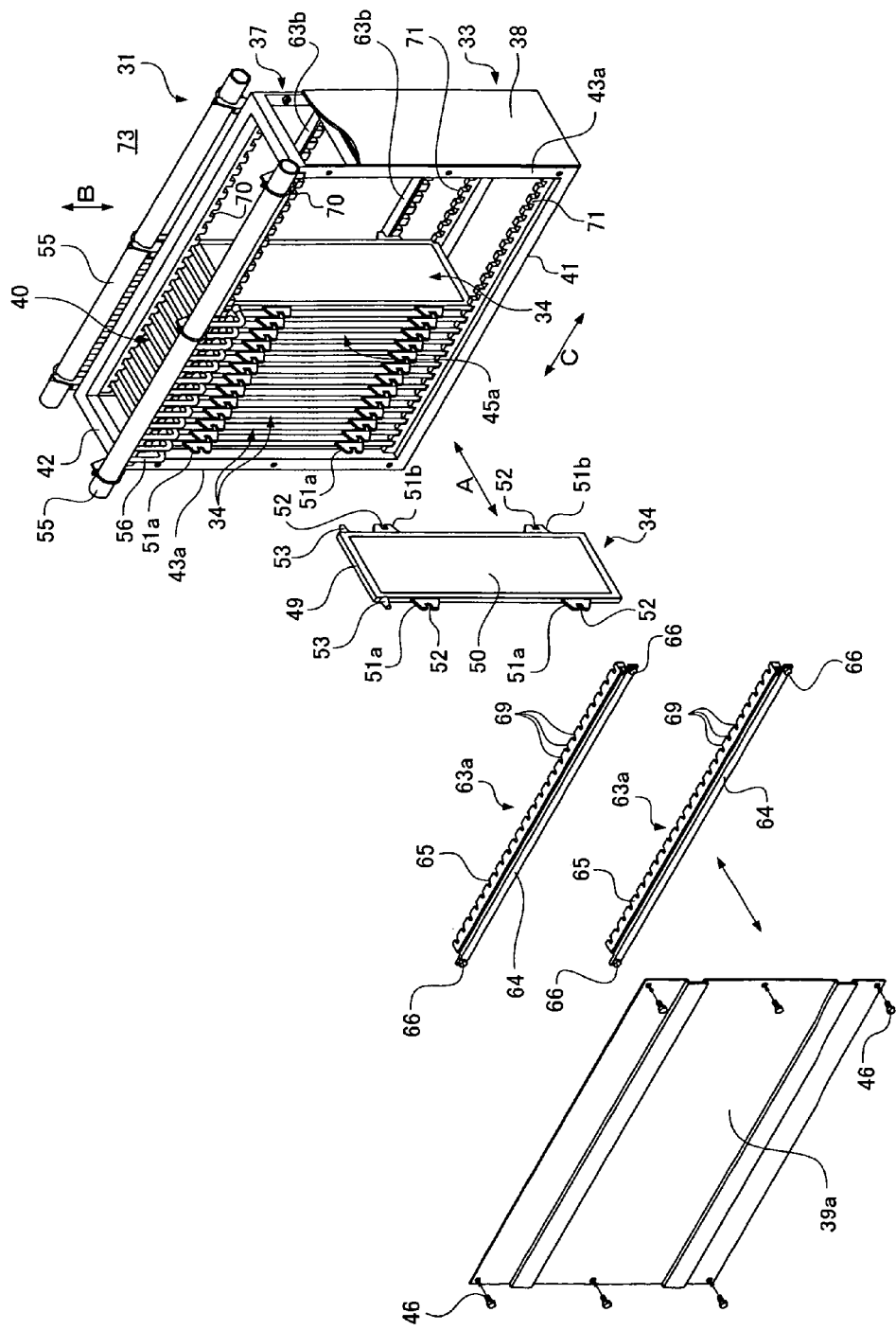
FIG. 2 is a perspective view showing a state in which a side cover and a supporting member are removed and a membrane cartridge is pulled out from a casing of the submerged membrane separator in the first embodiment.
Figure 3:
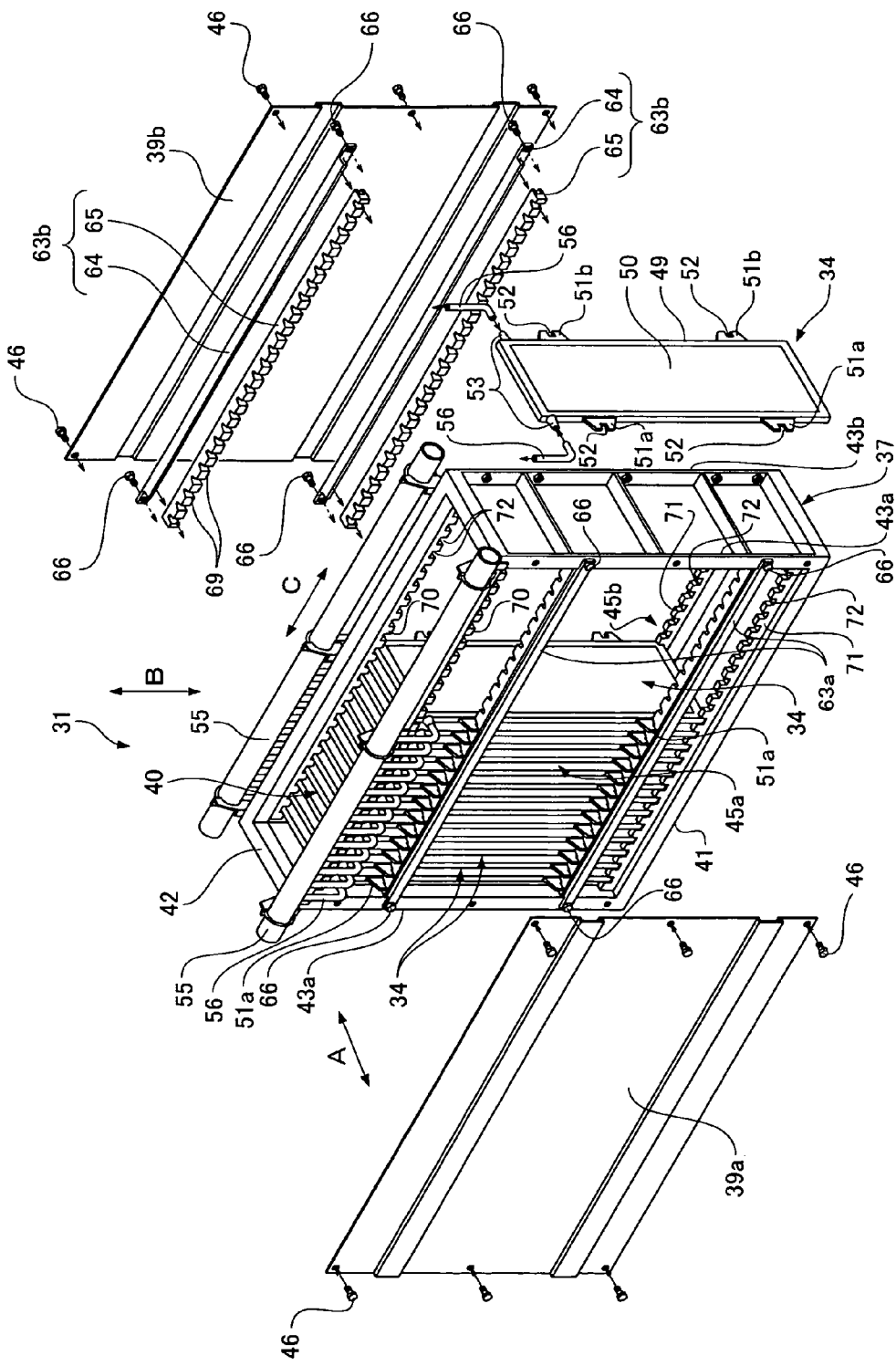
FIG. 3 is a disassembled perspective view showing the configuration of the submerged membrane separator in the first embodiment.

As shown in FIGS. 2 and 3, the casing 33 for membranes includes a frame body 37, a pair of front and rear end covers 38 that cover both front and rear ends of the frame body 37, and a pair of left and right side covers 39a and 39b detachably attached to both sides of the frame body 37.

The frame body 37 includes a bottom frame 41 having a square frame shape, an upper frame 42 having a square frame shape, and a plurality of vertical frames 43a and 43b coupled between four corners of both the frames 41 and 42.

Side openings 45a and 45b through which the membrane cartridges 34 can be removed and inserted in a width direction A (left-right direction) are formed on both the left and right sides of the frame body 37. One side cover 39a is attached to the frame body 37 by a plurality of bolts 46 and closes one side opening 45a. Similarly, the other side cover 39b is attached to the frame body 37 by a plurality of bolts 46 and closes the other side opening 45b. When the bolts 46 are unscrewed and one side cover 39a is removed from the frame body 37, one side opening 45a is opened. Similarly, when the other side cover 39b is removed from the frame body 37, the other side opening 45b is opened.

Each of the membrane cartridges 34 is formed in a rectangular shape long in the up-down direction and includes a filtration plate 49, filtration membranes 50 attached to both the front and rear sides of the filtration plate 49, and a plurality of supporting portions 51a and 51b. A pair of upper and lower supporting portions 51a and 51b are provided on both the sides of the filtration plate 49 in the width direction A and project to the outer side. Recesses 52 having a square shape are formed in the supporting portions 51a and 51b.

Water intake nozzles 53 (an example of water intake portions) for sucking treated water obtained by the filtration membranes 50 are provided at upper ends on both sides in the width direction A of the filtration plate 49. Permeate channels (not shown) that communicate with the water intake nozzles 53 are respectively formed on both the front and rear sides of the filtration plate 49. The permeate channels are covered with the filtration membranes 50.

As shown in FIGS. 1 to 3, a pair of left and right water collecting pipes 55 that collect treated water sucked from the water intake nozzles 53 of the membrane cartridges 34 are provided in the front-rear direction on the outer sides on the left and right of the upper frame 42 of the frame body 37. The water collecting pipes 55 and the water intake nozzles 53 are connected via connection pipes 56 having flexibility.

Figure 4:
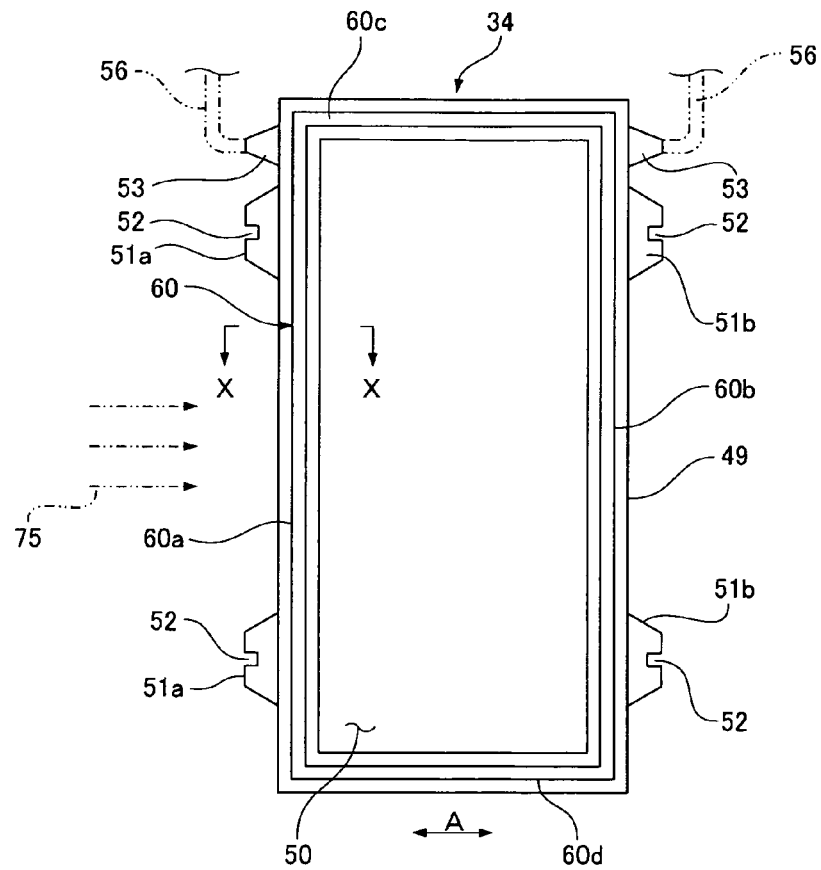
FIG. 4 is a front view of the membrane cartridge of the submerged membrane separator in the first embodiment.
Figure 5:
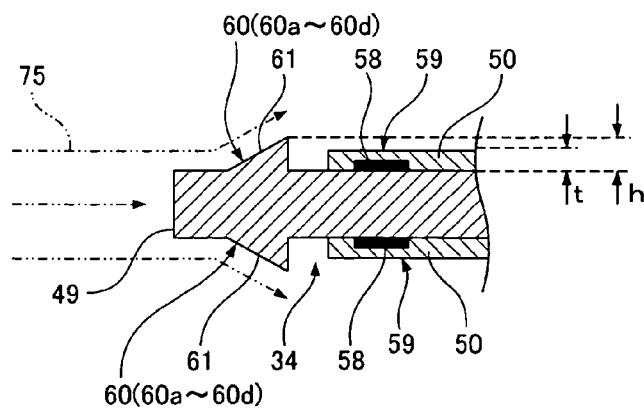
FIG. 5 is an X-X arrow view in FIG. 4.
Figure 6:
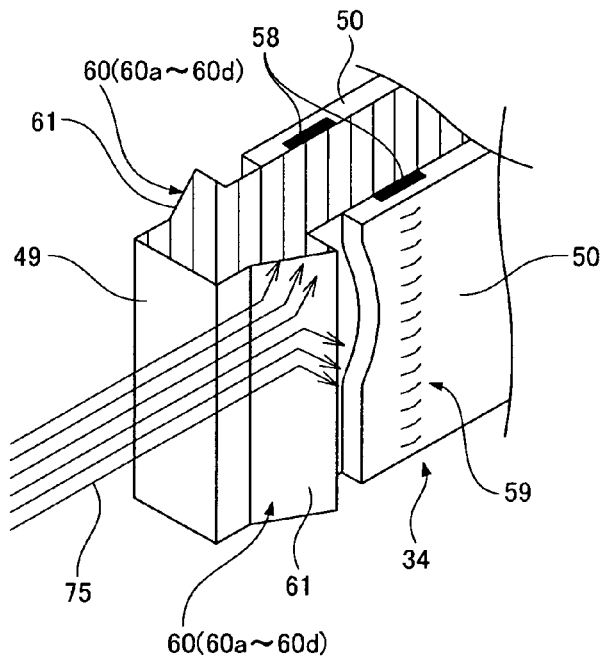
FIG. 6 is a sectional perspective view of projecting portions of the membrane cartridge of the submerged membrane separator in the first embodiment.

As shown in FIGS. 4 to 6, peripheral portions of the filtration membranes 50 are welded to the filtration plate 49 by ultrasound or the like, whereby the filtration membranes 50 are joined to the filtration plate 49. Melting allowances 58 are respectively projected and formed on both the front and rear sides of the filtration plate 49. These melting allowances 58 melt, whereby the peripheral portions of the filtration membranes 50 are welded to the filtration plate 49. Welded portions 59 of the filtration membranes 50 and the filtration plate 49 are formed over the entire periphery along the peripheral portions of the filtration membranes 50. A method of joining the filtration membranes 50 and the filtration plate 49 is not limited to the welding and may be fusion-bonding or bonding by an adhesive.

A projecting portion 60 that surrounds the outer side of the peripheral portion of the filtration membrane 50 is formed on each of both the front and rear surfaces of the filtration plate 49. The projecting portion 60 is equivalent to a portion higher than the surface of the filtration plate 49 corresponding to the peripheral edge of the filtration membrane 50. The projecting portion 60 is formed in a square frame shape by a projecting portion 60a on one side, a projecting portion 60b on the other side, an upper projecting portion 60c, and a lower projecting portion 60d.

The projecting portion 60a on one side is formed along the outer side of left or right one side of the filtration membrane 50. The projecting portion 60b on the other side is formed along the outer side of the other left or right side of the filtration membrane 50. The upper projecting portion 60c is continuously formed along the outer side of the upper side of the filtration membrane 50. The lower projecting portion 60d is continuously formed along the outer side of the lower side of the filtration membrane 50.

The projecting portion 60 has a triangular section and includes inclined surfaces 61 that further incline in a projecting direction from the surface of the filtration plate 49 in places closer to the peripheral edge of the filtration membrane 50 from the peripheral edge of the filtration plate 49. Height h from the surface of the filtration plate 49 to the distal end of the projecting portion 60 is set larger than height t (thickness) of the peripheral portions of the filtration membrane 50 (i.e., height h≥thickness t).

The filtration plate 49 may have a solid structure filled inside, may be a hollow structure having a hollow in the inside, or may be a frame body. The filtration plate 49 only has to have in a flat shape in a state in which the filtration membrane 50 is arranged.

Figure 8A:
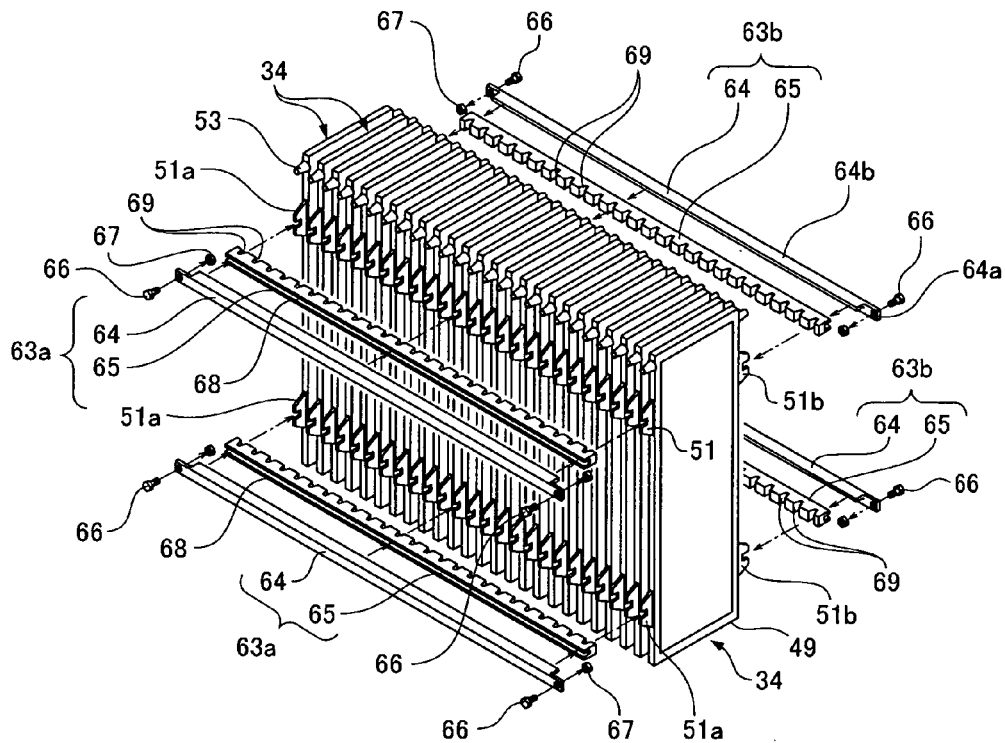
FIG. 8A is a disassembled perspective view of the supporting member of the submerged membrane separator in the first embodiment.

As shown in FIGS. 2 and 3, a pair of left and right supporting members 63a and 63b are provided in upper and lower two places in the inside of the casing 33 for membranes. As shown in FIGS. 8 and 9, these supporting members 63a and 63b support the supporting portions 51a and 51b of the membrane cartridges 34 while allowing movement in an up-down direction B. The supporting members 63a and 63b have horizontal frames 64 and supporting members 65 provided in the horizontal frames 64.

As shown in FIGS. 8 to 12, the horizontal frames 64 are angle-shaped members having vertical plate portions 64a and horizontal plate portions 64b. Both ends of the horizontal frames 64 are detachably coupled between the front and rear vertical frames 43a and 43b by bolts 66 and nuts 67.

A material of the supporting members 65 is an elastic material such as rubber. Grooves 68 are formed over the entire length on the outer surfaces of the supporting members 65. A plurality of front and rear V-shaped slits 69 are formed on the inner surfaces of the supporting members 65. The horizontal plate portions 64b of the horizontal frames 64 are inserted into the grooves 68 of the supporting members 65, whereby the supporting members 65 are attached to the horizontal frames 64.

Figure 9A:
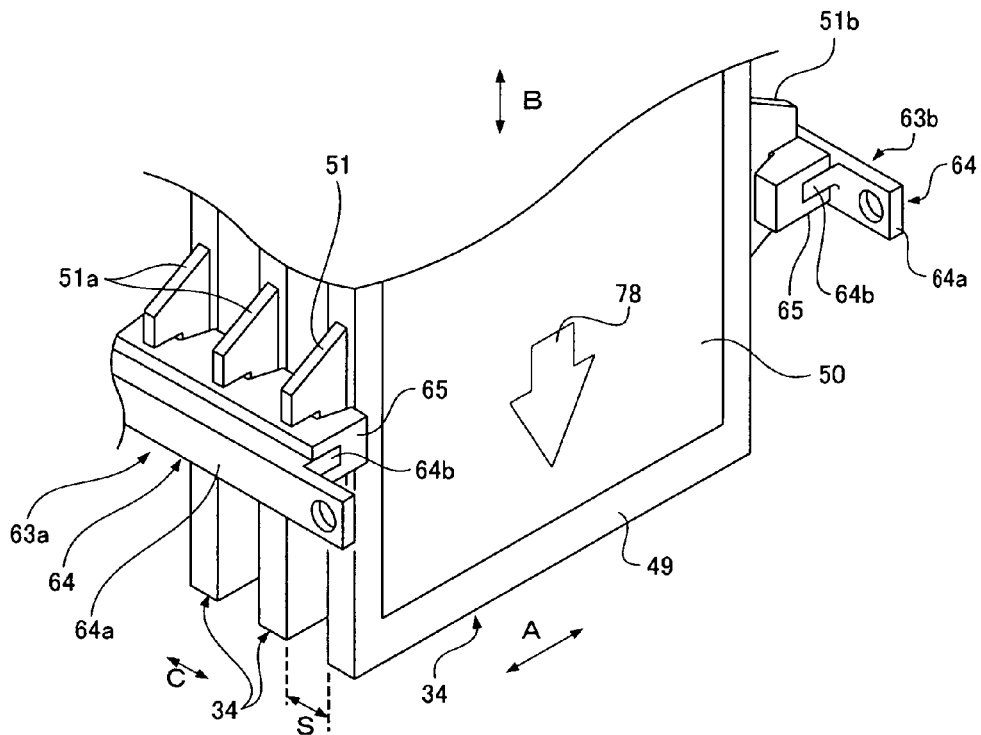
FIG. 9A is an enlarged perspective view of a mating portion of a slit of the supporting member of the submerged membrane separator and a slit of a supporting plate of the membrane cartridges in the first embodiment and shows a state in which air diffusion is stopped.
Figure 9B:
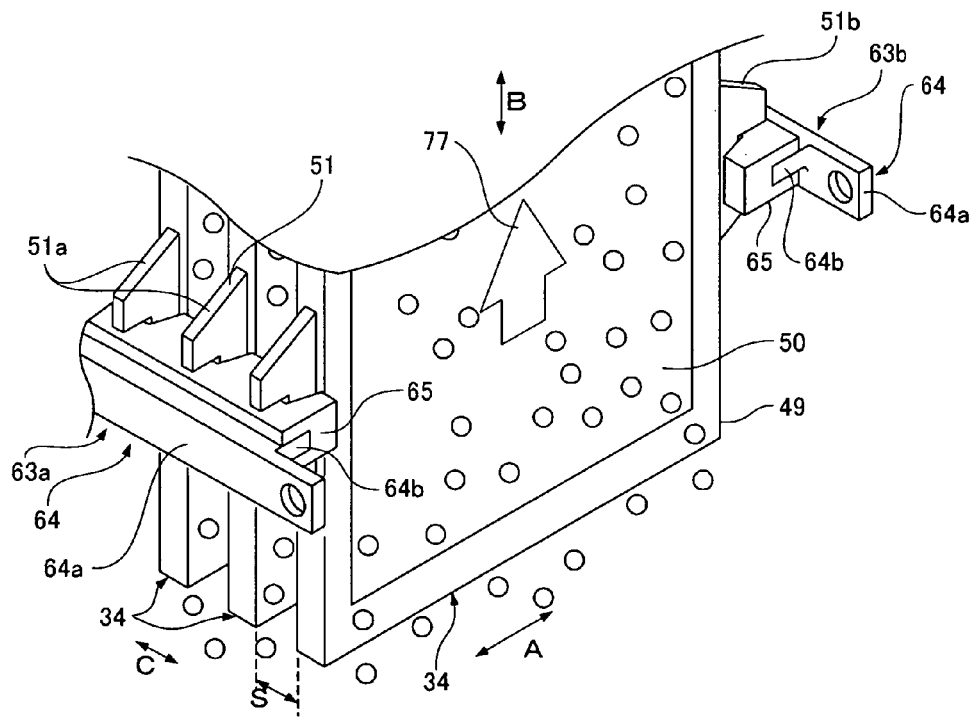
FIG. 9B is an enlarged perspective view of the mating portion of the slit of the supporting member of the submerged membrane separator and the slit of the supporting plate of the membrane cartridges in the first embodiment and shows a state in which air diffusion is performed.
Figure 10:
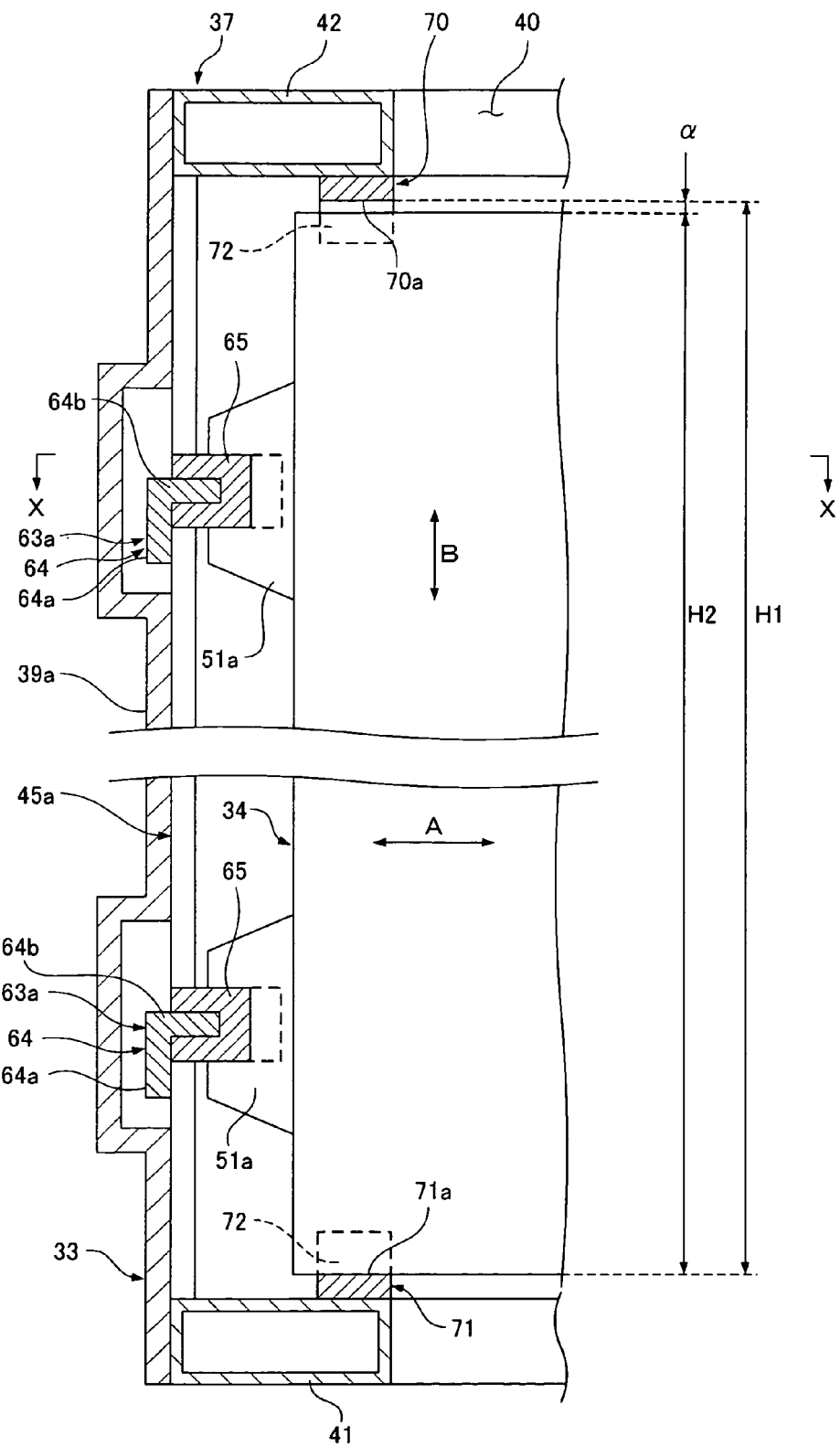
FIG. 10 is a longitudinal sectional view of left or right one side of the casing and left or right one side of the membrane cartridge of the submerged membrane separator in the first embodiment.
Figure 12A:
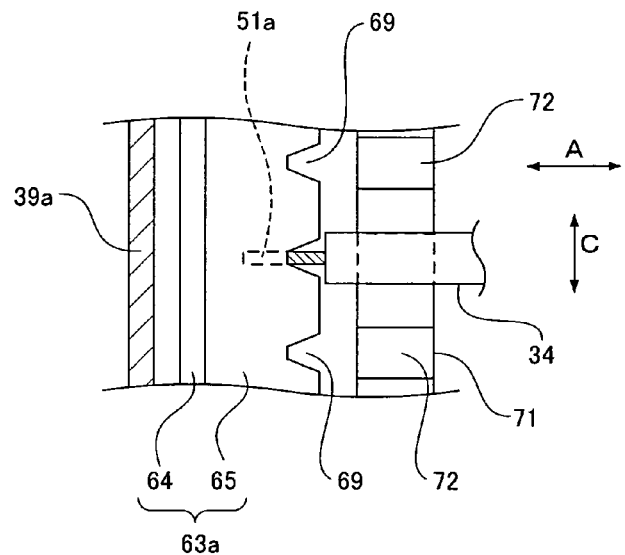
FIG. 12A is an X-X arrow view in FIG. 10.

As shown in FIGS. 9, 10, and 12A, the recesses 52 of the supporting portions 51a and 51b of the membrane cartridge 34 are inserted into the slits 69 of the supporting member 65. In this state, the membrane cartridges 34 are supported by the supporting members 63a and 63b and a space S in a thickness direction C between the membrane cartridges 34 is maintained at a predetermined space by the supporting members 63a and 63b. The recesses 52 of the supporting portions 51a and 51b are fit in the slits 69 of the supporting member 65 without backlashing in a width direction A (left-right direction), an up-down direction B, and an arrangement direction C (front-rear direction).

As shown in FIG. 3 and FIGS. 10 to 12, upper guiding members 70 and lower guiding members 71 are provided in the inside of the casing 33 for membranes. The upper guiding members 70 and the lower guiding members 71 are members for guiding the membrane cartridge 34 in the width direction A (left-right direction) and regulating an amount of movement of the membrane cartridge 34 supported by the supporting members 63a and 63b in the up-down direction B to a predetermined allowable movement amount α. A pair of left and right upper guiding members 70 are provided in the upper frame 42 of the frame body 37 and a pair of left and right lower guiding members 71 are provided in the bottom frame 41.

A plurality of front and rear guide grooves 72 are formed in each of the upper and lower guiding members 70 and 71. The upper end of the membrane cartridge 34 can be inserted into and removed from the guide grooves 72 of the upper guiding members 70 from the width direction A (left-right direction). The lower end of the membrane cartridge 34 can be inserted into and removed from the guide grooves 72 of the lower guiding members 71 from the width direction A (left-right direction).

Height H1 between upper inner surfaces 70a of the guide grooves 72 of the upper guiding members 70 and lower inner surfaces 71a of the guide grooves 72 of the lower guiding members 71 is set slightly higher than height H2 of the membrane cartridge 34. A difference between the height H1 and the height H2 is equivalent to the allowable movement amount α (i.e., H1−H2=α).

Actions in the configuration are explained below.

(1) As shown in FIG. 1, during filtration operation, the inner side of the membrane cartridges 34 is decompressed while air diffusion is performed from the air diffuser 36, whereby sludge or the like in liquid to be treated 74 is caught by the filtration membranes 50 of the membrane cartridges 34. Permeate permeating through the filtration membranes 50 and flowing into the inner side of the membrane cartridges 34 is collected as treated water 79 in the water collecting pipe 55 from the water intake nozzles 53 through the connection pipes 56.

In this case, as shown in FIG. 9B, upflow 77 is generated between the membrane cartridges 34 by air bubbles of the air diffused from the air diffuser 36. The matter adhering to the membrane surfaces of the membrane cartridges 34 is removed by the upflow 77.

As shown in FIGS. 3 and 4, since the water intake nozzles 53 are provided at the upper ends on both the sides of the filtration plate 49, the upflow 77 smoothly flows without hitting against the connection pipes 56. Therefore, the matter adhering to the membrane surfaces of the membrane cartridges 34 is sufficiently removed. Since the upflow 77 does not hit against the connection pipes 56, vibration of the connection pipes 56 is reduced and it is possible to prevent a crack from occurring around the water intake nozzles 53.

Figure 11:
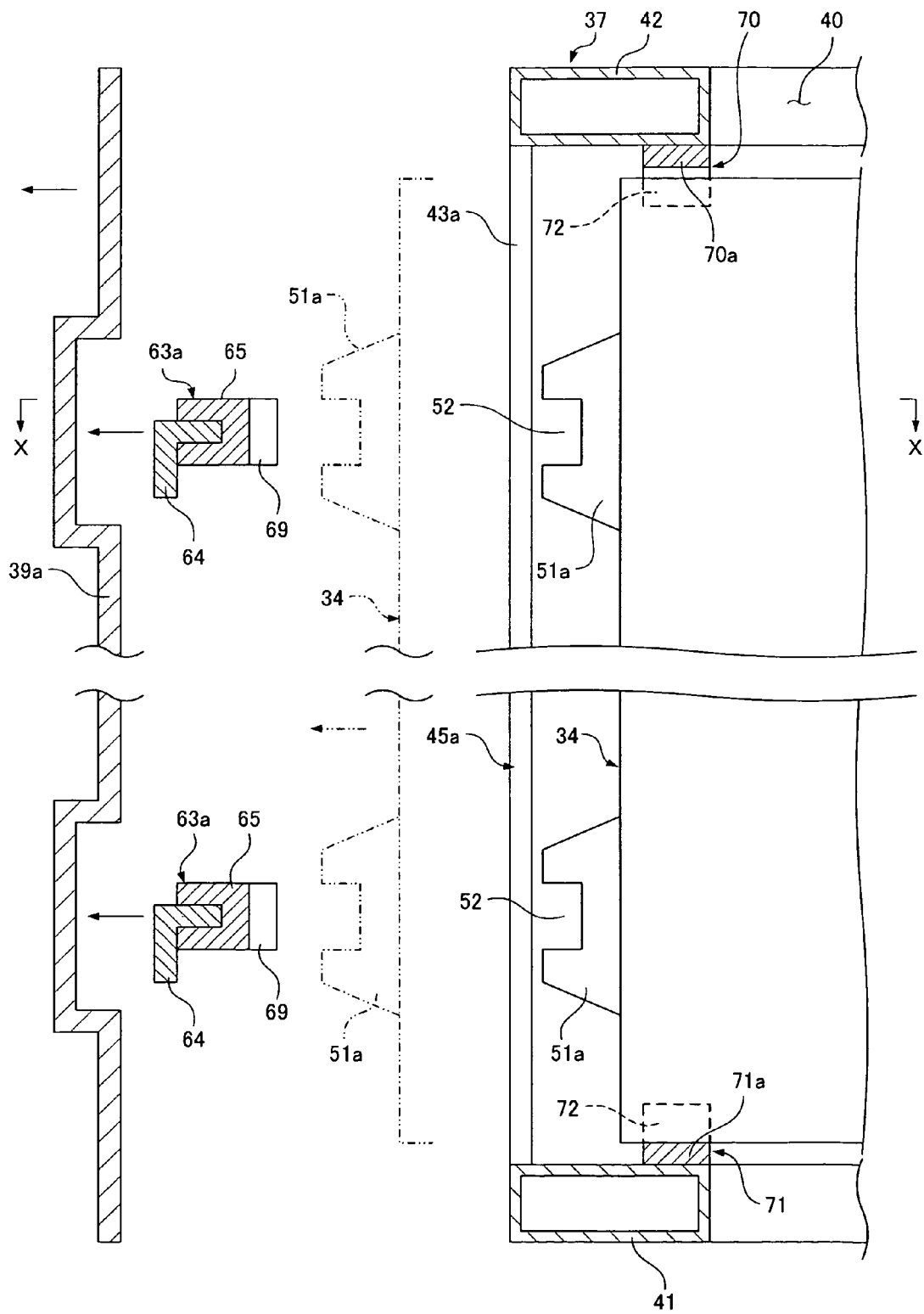
FIG. 11 is a longitudinal sectional view of left or right one side of the casing and left or right one side of the membrane cartridge of the submerged membrane separator in the first embodiment and shows a state in which the side cover and the supporting member is removed from the casing.

(2) When the membrane cartridge 34 is removed in maintenance or the like, after the air diffusion by the air diffuser 36 is stopped, the filtration operation is stopped, and the liquid to be treated in the treatment tank 32 is discharged, as shown in FIGS. 2 and 11, the bolts 46 are unscrewed to remove one side cover 39a from the frame body 37 and open one side opening 45a.

Figure 12B:
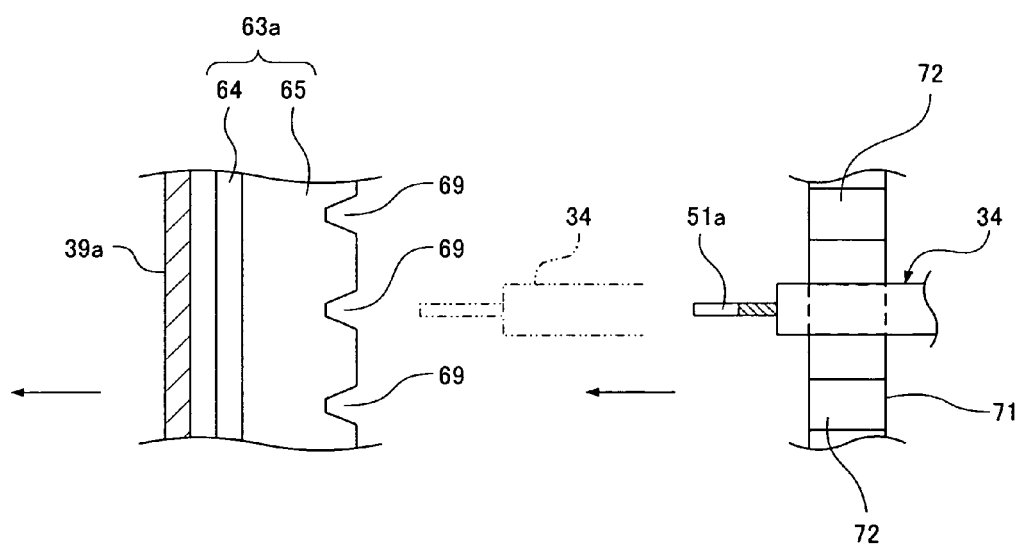
FIG. 12B is an X-X arrow view in FIG. 11.

Subsequently, the bolts 66 are unscrewed to remove the supporting members 63a on one of the left and right from the frame body 37. Consequently, as shown in FIGS. 11 and 12B, the supporting portions 51a on one of the left and right of the membrane cartridge 34 disengage from the slits 69 of the supporting members 63a on one of the left and right. Thereafter, as indicated by imaginary lines of FIGS. 2 and 11, the membrane cartridge 34 can be pulled out from the inside of the casing 33 for membranes in the width direction A of the membrane cartridge 34 through one side opening 45a and taken out to the outer side of the casing 33. At this point, the recesses 52 of the supporting portions 51b on the other of the left and right of the membrane cartridge 34 disengage from the slits 69 of the supporting members 63b on the other of the left and right. The membrane cartridge 34 is pulled out in the width direction A while being guided by the upper and lower guide grooves 72.

Consequently, it is possible to easily pull out the membrane cartridge 34 from the inside of the casing 33 in the left-right horizontal direction. As shown in FIG. 1, it is possible to suppress the height of the space 73 above the casing 33 low. Even when sludge clogs between the sides of the membrane cartridges 34 opposed to each other, it is possible to easily pull out the membrane cartridges 34 from the inside of the casing 33.

(3) When the membrane cartridge 34 is attached, as shown in FIGS. 2 and 11, the membrane cartridge 34 is inserted from the outer side of the casing 33 in the width direction A of the membrane cartridge 34 through one side opening 45a. At this point, the membrane cartridge 34 is inserted in the width direction A while being guided by the upper and lower guide grooves 72. The recesses 52 of the supporting portions 51b on the other of the left and right of the membrane cartridge 34 are inserted into the slits 69 of the supporting members 63b on the other of the left and right.

Figure 8B:
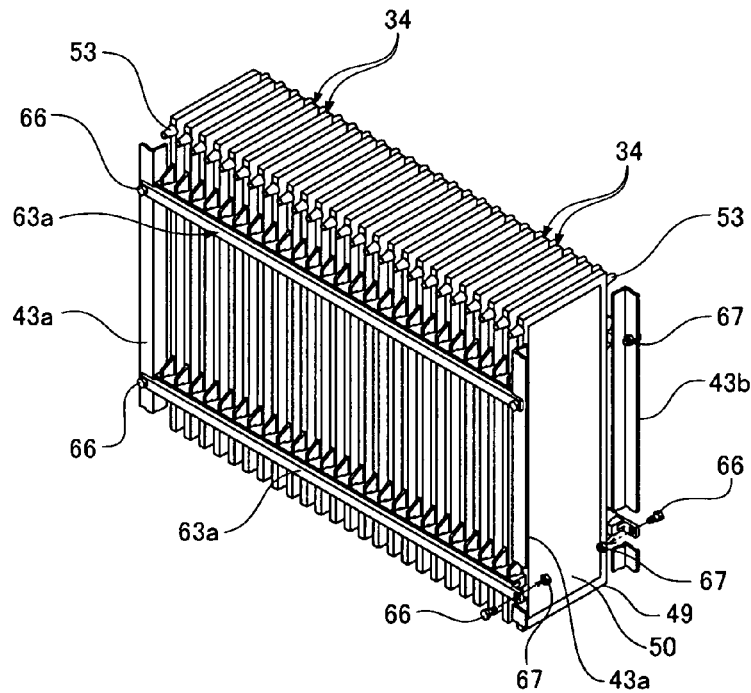
FIG. 8B is a perspective view of the membrane cartridges restrained by the supporting member of the submerged membrane separator in the first embodiment.

Subsequently, as shown in FIG. 8B, the bolts 66 are screwed to attach the supporting members 63a on one of the left and right to the vertical frames 43a on one of the left and right of the frame body 37. Consequently, as shown in FIGS. 10 and 12A, the recesses 52 of the supporting portions 51a on one of the left and right of the membrane cartridges 34 are inserted into the slits 69 of the supporting members 63a on one of the left and right.

Thereafter, the bolts 46 are screwed to attach one side cover 39a to the frame body 37 as shown in FIGS. 10 and 12A to close one side opening 45a. Consequently, the membrane cartridge 34 is housed in the inside of the casing 33 and supported by the supporting members 63a and 63b.

As explained above, one side opening 45a of the casing 33 for membranes is closed by one side cover 39a and the other side opening 45b is closed by the other side cover 39b. Therefore, during filtration operation, it is possible to prevent air bubbles of the air diffused from the air diffuser 36 from escaping to the outside of the casing 33 through the side openings 45a and 45b.

(4) When properties of the liquid to be treated are deteriorated and sludge clogs between the membrane cartridges 34, an operator jets high-pressure cleaning liquid 75 from an injection nozzle 76 of a cleaning device (not shown) to clean the membrane cartridges 34. In this case, after the air diffusion by the air diffuser 36 is stopped, the filtration operation is stopped, and the liquid to be treated in the treatment tank 32 is discharged, as shown in FIG. 2, the bolts 46 are unscrewed to remove one side cover 39a from the frame body 37 and open one side opening 45a.

Figure 7:
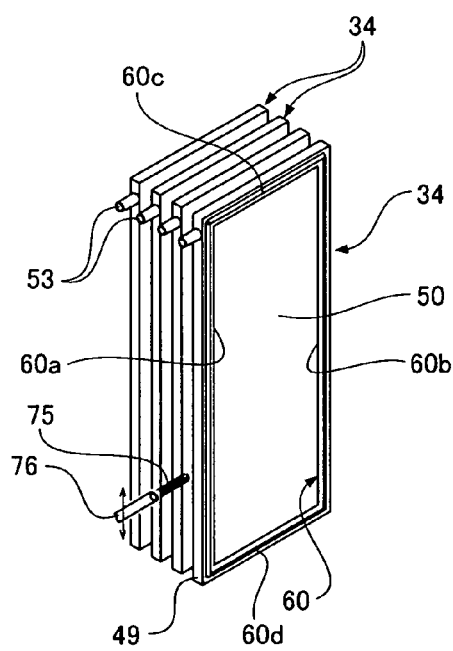
FIG. 7 is a perspective view showing a method of jetting cleaning liquid on and cleaning membrane cartridges of the submerged membrane separator in the first embodiment.

Subsequently, as shown in FIG. 7, the injection nozzle 76 is opposed to one side opening 45a and the high-pressure cleaning liquid 75 is jetted from the injection nozzle 76 to the membrane cartridges 34. Consequently, the high-pressure cleaning liquid 75 is jetted to spaces between the membrane cartridges 34 from one side through one side opening 45a, the sludge clogging between the membrane cartridges 34 is smashed and removed, and the membrane surfaces of the membrane cartridges 34 are cleaned.

In this case, as shown in FIGS. 5 and 6, the cleaning liquid 75 hits against the projecting portion 60a on one side immediately before left or right one side edge of the filtration membrane 50 and the direction of the cleaning liquid 75 is bent by the projecting portion 60a on one side. Therefore, it is possible to prevent the cleaning liquid 75 from directly hitting against left or right one side edge of the filtration membrane 50. Consequently, it is possible to prevent left or right one side edge of the filtration membrane 50 from peeling from the filtration plate 49.

A type of the cleaning liquid 75 is not specifically limited. For example, water, hot water, activated sludge, acid solution, or alkaline solution is used.

In the first embodiment, as shown in FIG. 2, one side cover 39a and one supporting member 63a are removed from the frame body 37 to open one side opening 45a and remove the membrane cartridge 34 from and insert the membrane cartridge 34 into the casing 33 from one side opening 45a. However, as shown in FIG. 3, the other side cover 39b and the other supporting member 63b may be removed from the frame body 37 to remove the membrane cartridge 34 from and insert the membrane cartridge 34 into the casing 33 from the other side opening 45b.

In the first embodiment, as shown in FIG. 3, the pair of left and right water intake nozzles 53 are provided in the membrane cartridge 34 and the pair of left and right water collecting pipes 55 are provided in the frame body 37. However, only the left or right water intake nozzle 53 may be provided and only the left or right water collecting pipe 55 may be provided.

In the first embodiment, as shown in FIG. 2, one side cover 39a is removed from the frame body 37 to open one side opening 45a and jet the cleaning liquid 75 from one side opening 45a to the spaces between the membrane cartridges 34. However, as shown in FIG. 3, the other side cover 39b may be removed from the frame body 37 to open the other side opening 45b and jet the cleaning liquid 75 from the other side opening 45b to the spaces between the membrane cartridges 34. In this case, since the cleaning liquid 75 hits against the projecting portions 60b on the other side of the membrane cartridges 34, it is possible to prevent the cleaning liquid 75 from directly hitting against the left or right other side edges of the filtration membranes 50. Alternatively, the cleaning liquid 75 may be jetted from the upper opening 40 of the casing 33 to the spaces between the membrane cartridges 34. In this case, since the cleaning liquid 75 hits against the projecting portions 60c above the membrane cartridges 34, it is possible to prevent the cleaning liquid 75 from directly hitting against the upper edges of the filtration membranes 50.

Next, a second embodiment in the present invention is explained.

Figure 13:
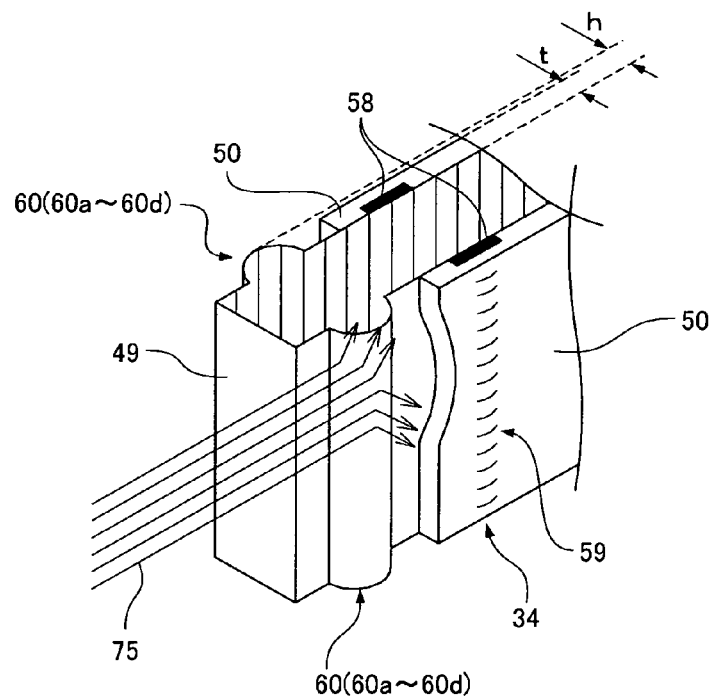
FIG. 13 is a sectional perspective view of projecting portions of a membrane cartridge of a submerged membrane separator in a second embodiment of the present invention.

As shown in FIG. 13, the section of the projecting portions 60 of the membrane cartridge 34 is formed in a semicircular shape. Consequently, as in the first embodiment, when an operator jets the high-pressure cleaning liquid 75 from the injection nozzle 76 of the cleaning device and cleans the membrane cartridge 34, the cleaning liquid 75 hits against the projecting portion 60a on one side immediately before left or right one side edge of the filtration membrane 50 and the direction of the cleaning liquid 75 is bent by the projecting portion 60a on one side. Therefore, it is possible to prevent the cleaning liquid 75 from directly hitting against left or right one side edge of the filtration membrane 50.

Next, a third embodiment in the present invention is explained.

Figure 14:
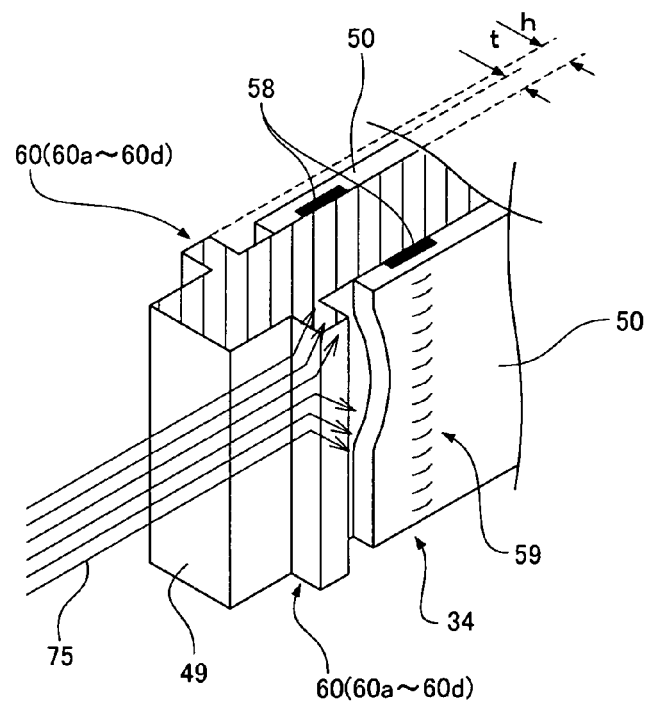
FIG. 14 is a sectional perspective view of projecting portions of a membrane cartridge of a submerged membrane separator in a third embodiment of the present invention.

As shown in FIG. 14, the section of the projecting portions 60 of the membrane cartridge 34 is formed in a square shape. Consequently, as in the first embodiment, when an operator jets the high-pressure cleaning liquid 75 from the injection nozzle 76 of the cleaning device and cleans the membrane cartridge 34, the cleaning liquid 75 hits against the projecting portion 60a on one side immediately before left or right one side edge of the filtration membrane 50 and the direction of the cleaning liquid 75 is bent by the projecting portion 60a on one side. Therefore, it is possible to prevent the cleaning liquid 75 from directly hitting against left or right one side edge of the filtration membrane 50.

Next, a fourth embodiment in the present invention is explained.

Figure 15:
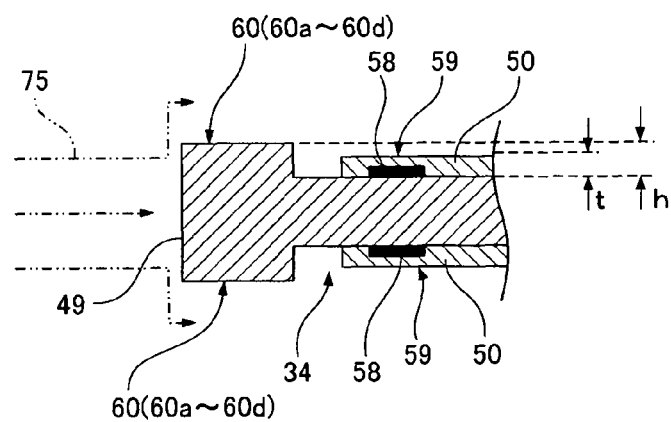
FIG. 15 is a sectional perspective view of projecting portions of a membrane cartridge of a submerged membrane separator in a fourth embodiment of the present invention.

As shown in FIG. 15, the section of the projecting portions 60 of the membrane cartridge 34 is formed in a square shape. The outer peripheral edges of the projecting portions 60 are extended to the outer edge of the filtration plate 49.

Next, a fifth embodiment in the present invention is explained.

Figure 16:
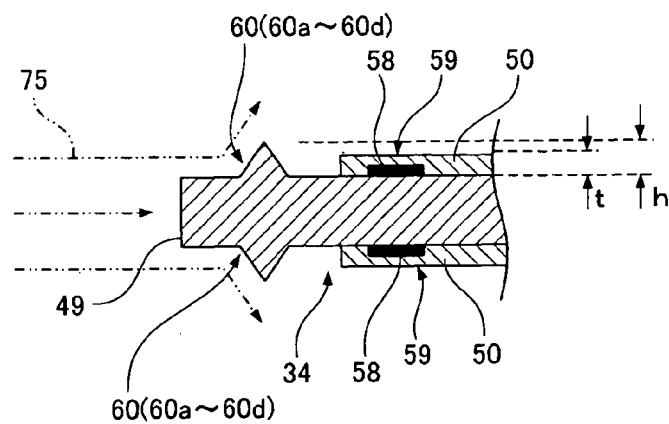
FIG. 16 is a sectional perspective view of projecting portions of a membrane cartridge of a submerged membrane separator in a fifth embodiment of the present invention.

As shown in FIG. 16, the section of the projecting portions 60 of the membrane cartridge 34 is formed in a triangular shape.

Next, a sixth embodiment in the present invention is explained.

Figure 17:
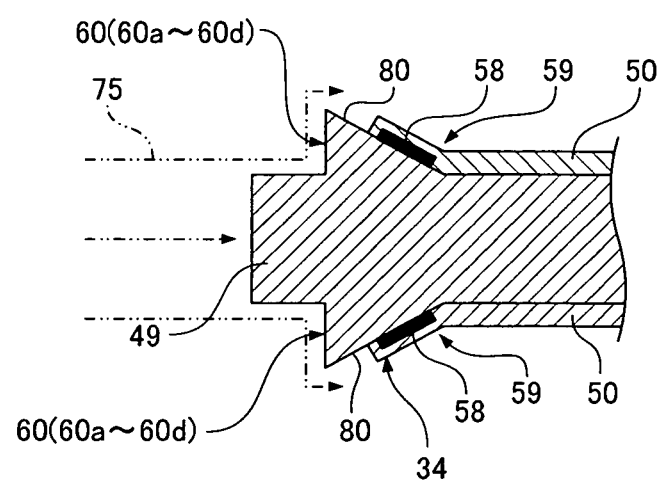
FIG. 17 is a sectional perspective view of projecting portions of a membrane cartridge of a submerged membrane separator in a sixth embodiment of the present invention.

As shown in FIG. 17, the projecting portions 60 of the membrane cartridge 34 have a section of a regular triangular shape. The projecting portions 60 include inclined surfaces 80 that further incline in a projecting direction from the surface of the filtration plate 49 in places closer to the outer peripheral edge of the filtration plate 49 from the filtration membranes 50. The peripheral portions of the filtration membranes 50 are joined to the inclined surfaces 80.

In the first to sixth embodiments, the continuous linear projecting portions 60 are provided in the filtration plate 49. However, the projecting portions 60 are not limited to the linear shape and may be a wavy shape. A plurality of the projecting portions 60 may be provided to be superimposed on inner and outer sides (e.g., may be provided double on inner and outer sides) in the filtration plate 49.

Next, a seventh embodiment in the present invention is explained.

As shown in FIG. 18A, the projecting portions 60 are intermittently (discontinuously) provided at predetermined spaces 81. These projecting portions 60 are provided double on inner and outer sides. The projecting portions 60 on an inner side 82 are disposed in positions corresponding to the spaces 81 of the projecting portions 60 on an outer side 83.

Consequently, the cleaning liquid 75 hits against the projecting portions 60 on the outer side 83 immediately before left or right one side edge of the filtration membrane 50. The cleaning liquid 75 passing through the spaces 81 of the projecting portions 60 on the outer side 83 hits against the projecting portion 60 on the inner side 82 immediately before left or right one side edge of the filtration membrane 50. Consequently, the direction of the cleaning liquid 75 is bent. Therefore, it is possible to prevent the cleaning liquid 75 from directly hitting against left or right one side edge of the filtration membrane 50 and prevent left or right one side edge of the filtration membrane 50 from peeling from the filtration plate 49. In the seventh embodiment, the projecting portions 60 are provided double on the inner and outer side. However, the projecting portions 60 may be provided triple or more.

Next, an eighth embodiment in the present invention is explained.

Figure 18B:
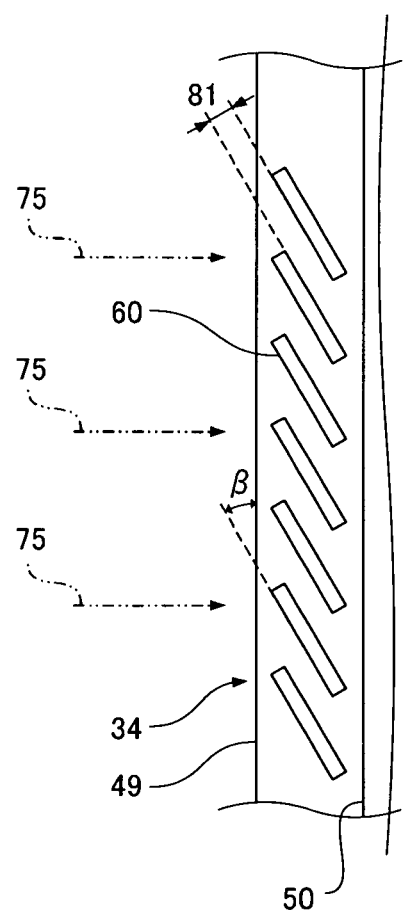
FIG. 18B is an enlarged view of a peripheral portion of a membrane cartridge of a submerged membrane separator in an eighth embodiment of the present invention.

As shown in FIG. 18B, the projecting portions 60 are intermittently (discontinuously) provided at the predetermined spaces 81. These projecting portions 60 incline at a predetermined angle β with respect to the outer edge side of the filtration plate 49 to overlap when viewed from the jetting direction of the cleaning liquid 75.

Consequently, the cleaning liquid 75 hits against the projecting portions 60 immediately before left or right one side edge of the filtration membrane 50. Consequently, the direction of the cleaning liquid 75 is bent. Therefore, it is possible to prevent the cleaning liquid 75 from directly hitting left or right one side edge of the filtration membrane 50 and prevent left or right one side edge of the filtration membrane 50 from peeling from the filtration plate 49. In the seventh and eighth embodiments, when viewed from a direction parallel to the jetting direction of the cleaning liquid 75, i.e., the membrane surface direction of the filtration membrane 50 and substantially perpendicular to the peripheral edge side of the filtration membrane 50, it is sufficient that there is no space between the projecting portions 60. The projecting portions 60 do not have to overlap.

Next, a ninth embodiment in the present invention is explained.

Figure 18C:
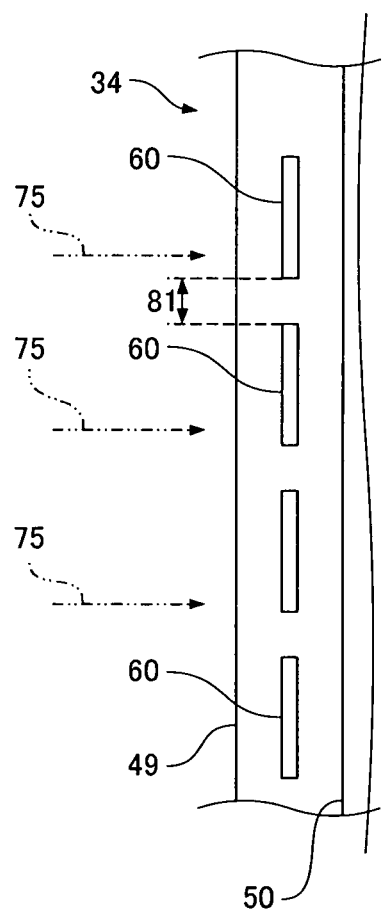
FIG. 18C is an enlarged view of a peripheral portion of a membrane cartridge of a submerged membrane separator in a ninth embodiment of the present invention.

As shown in FIG. 18C, the projecting portions 60 are intermittently (discontinuously) provided at the predetermined spaces 81. In this case, the cleaning liquid 75 that collides against the projecting portions 60 adjacent to each other obstructs a flow of the cleaning liquid 75 about to pass through the space 81 and weakens the flow. On the basis of such an action, the spaces 81 only have to be set to size for preventing the filtration membrane 50 from peeling even if the cleaning liquid 75 passes through the spaces 81. For example, a proportion of the spaces 81 in a formation area of the projecting portions 60 is set to be equal to or smaller than 50%.

In the seventh to ninth embodiments, the projecting portions 60 are formed in a belt shape. However, the projecting portions 60 are not limited to the belt shape and may be formed in, for example, a circular shape.

Figure 19:
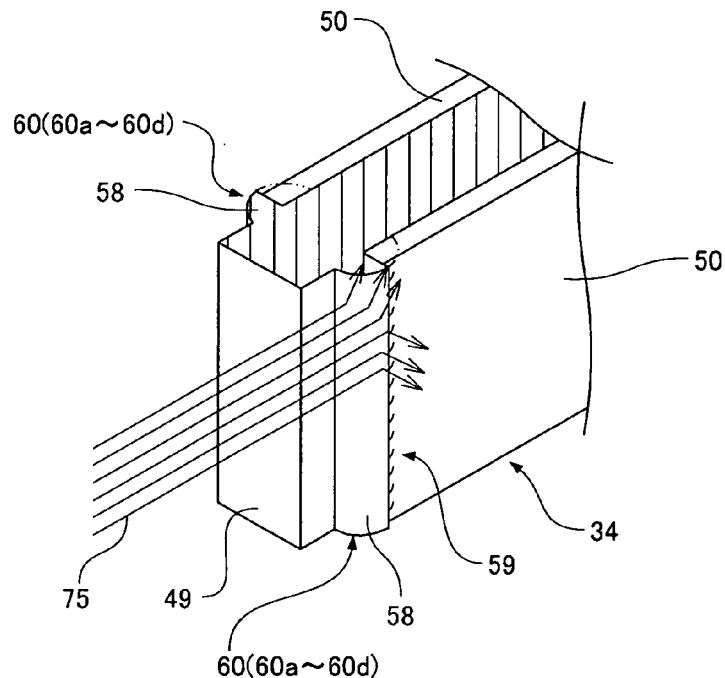
FIG. 19 is a sectional perspective view of projecting portions of a membrane cartridge of a submerged membrane separator in a tenth embodiment of the present invention.

Next, a tenth embodiment in the present invention is explained with reference to FIG. 19.

Melting allowances 58 having a square frame shape are formed to be projected on both the front and rear sides of the filtration plate 49. These melting allowances 58 melt, whereby the peripheral edge portions of the filtration membranes 50 are welded to the filtration plate 49. Outer side portions of the melting allowances 58 further extend to the outer side than the peripheral edge portions of the filtration membranes 50. Extending portions of the melting allowances 58 are also used as the projecting portions 60. Consequently, the peripheral edge portions of the filtration membranes 50 are joined to the projecting portions 60 over the entire periphery.

As explained, since the extending portions of the melting allowances 58 are also used as the projecting portions 60, labor and time for forming the projecting portions 60 separately from the melting allowances 58 are saved.

In the embodiments, the projecting portion 60a on one side, the projecting portion 60b on the other side, the upper projecting portion 60c, and the lower projecting portion 60d are provided in the four places of the filtration plate 49 of the membrane cartridge 34. However, at least the projecting portion on any one of the sides between these projecting portions 60a to 60d on the four sides may be provided. In this case, the cleaning liquid 75 only has to be jetted from the side of the provided projecting portion on at least one side.

Figure 20:
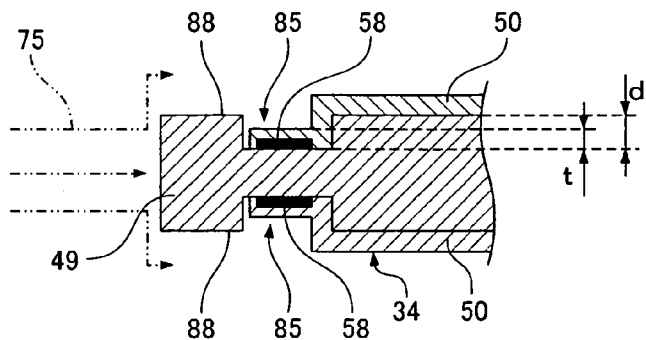
FIG. 20 is a sectional view of recesses of a membrane cartridge of a submerged membrane separator in an eleventh embodiment of the present invention.

In the embodiments, the projecting portions 60 are formed on the filtration plate 49. However, in an eleventh embodiment in the present invention, as shown in FIG. 20, recesses 85 are formed on both the front and rear sides of the filtration plate 49 instead of the projecting portions 60. The recesses 85 have a square sectional shape. The peripheral edges of the filtration membranes 50 enter the bottoms in the recesses 85. Outer side edges 88 of the recesses 85 are equivalent to the portions higher than the surfaces of the filtration plate 49 corresponding to the peripheral edges of the filtration membranes 50. Depth d of the recesses 85 is set to be equal to or larger than thickness t of the filtration membranes 50 (i.e., depth d≥thickness t).

Consequently, when the high-pressure cleaning liquid 75 is jetted from the injection nozzle 76 to left or right one side edge of the membrane cartridge 34 to clean the membrane cartridge 34, since the peripheral edges of the filtration membranes 50 enter (fall to) the bottoms in the recesses 85, it is possible to prevent the cleaning liquid 75 from directly hitting against left or right one side edges of the filtration membranes 50. Consequently, it is possible to prevent left or right one side edge of the filtration membrane 50 from peeling from the filtration plate 49.

Figure 21:
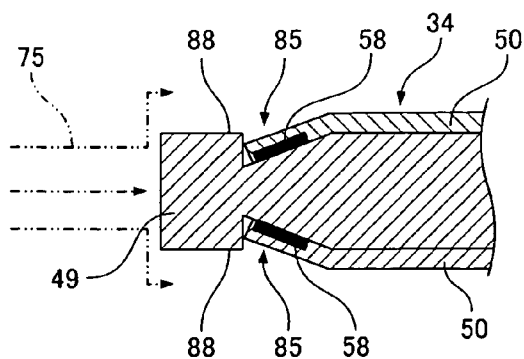
FIG. 21 is a sectional view of recesses of a membrane cartridge of a submerged membrane separator in a twelfth embodiment of the present invention.

Next, a twelfth embodiment in the present invention is explained with reference to FIG. 21. The recesses 85 have a triangular sectional shape that inclines deeper on sides closer to the outer edge of the filtration plate 49. The peripheral edges of the filtration membranes 50 fall into the recesses 85 along inclined surfaces. The outer side edges 88 of the recesses 85 are equivalent to the portions higher than the surfaces of the filtration plate 49 corresponding to the peripheral edges of the filtration membranes 50.

Consequently, when the high-pressure cleaning liquid 75 is jetted from the injection nozzle 76 to left or right one side edge of the membrane cartridge 34 to clean the membrane cartridge 34, since the peripheral edges of the filtration membranes 50 enter and are located on (fall to) the bottoms in the recesses 85, it is possible to prevent the cleaning liquid 75 from directly hitting against left or right one side edges of the filtration membranes 50. Consequently, it is possible to prevent left or right one side edge of the filtration membrane 50 from peeling from the filtration plate 49.

In the eleventh and twelfth embodiments, a recess 85a on one side, a recess 85b on the other side, an upper recess 85c, and a lower recess 85d are provided in four places of the filtration plate 49 of the membrane cartridge 34. However, at least the projecting portion on any one of the sides between these recesses 85a to 85d on the four sides may be provided. In this case, the cleaning liquid 75 only has to be jetted from the side of the provided recess on at least one side.

Figure 22:
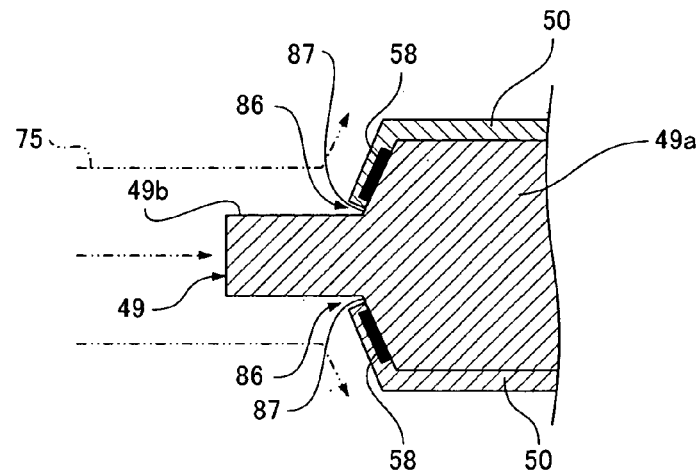
FIG. 22 is a sectional view of a peripheral portion of a membrane cartridge of a submerged membrane separator in a thirteenth embodiment of the present invention.

Next, a thirteenth embodiment in the present invention is explained with reference to FIG. 22.

The filtration plate 49 includes a filtration plate main body portion 49a and a peripheral portion 49b formed in the periphery of the filtration plate main body portion 49a. The thickness of the peripheral portion 49b is smaller than the thickness of the filtration plate main body portion 49a. The filtration membranes 50 are provided on both front and rear surfaces of the filtration plate main body portion 49a. A step portion 86 is formed over the entire circumference between the filtration plate main body portion 49a and the peripheral portion 49b. Inclined surfaces 87 are formed in the step portion 86. The inclined surfaces 87 is inclined in a direction in which the thickness of the filtration plate 49 decreases further in an outer side direction. The peripheral portions of the filtration membranes 50 are bent and welded to the inclined surfaces 87. A method of joining the filtration membranes 50 and the filtration plate 49 is not limited to the welding and may be fusion-bonding or bonding by an adhesive.

Consequently, when the high-pressure cleaning liquid 75 is jetted from the injection nozzle 76 to left or right one side edge of the membrane cartridge 34 to clean the membrane cartridge 34, the cleaning liquid 75 hits against left or right one sides of the peripheral edge portions of the filtration membranes 50 joined to the inclined surfaces 87 of the filtration plate 49. Therefore, left or right one sides of the peripheral portions of the filtration membranes 50 are subjected to a flow of the cleaning liquid 75 and pressed against the inclined surfaces 87. Consequently, it is possible to prevent the peripheral portions of the filtration membranes 50 from peeling from the filtration plate 49.

In the thirteenth embodiment, the inclined surfaces 87 are formed on the four sides in the peripheral portion of the filtration plate 49 of the membrane cartridge 34. However, it is also possible that the inclined surface 87 is formed on at least one of the sides of the filtration plate 49 and at least one of the sides of the peripheral portion of the filtration membrane 50 is bent and welded to the inclined surface 87. In this case, the cleaning liquid 75 only has to be jetted from the side of one side on which the inclined surface 87 is formed.

Next, a fourteenth embodiment in the present invention is explained with reference to FIGS. 23 to 25.

The filtration membrane 50 of the membrane cartridge 34 is divided into upper and lower two portions 91 and 92. A boundary section where the upper portion 91 and the lower portion 92 are adjacent to each other is welded to the filtration plate 49. Consequently, a welded portion 93 is formed over the entire width of the filtration membrane 50 in the boundary section in the vertical center of the filtration membrane 50.

Two water intake nozzles 53a and 53b for sucking treated water obtained by the membrane filtration 50 are provided in the filtration plate 49. The upper water intake nozzle 53a is provided on left or right one side of the filtration plate 49 and at the upper end of the upper portion 91. The lower water intake nozzle 53b is provided on left or right one side of the filtration plate 49 and at the upper end of the lower portion 92.

A pair of upper and lower water collecting piles 55a and 55b that collect treated water sucked from the water intake nozzles 53a and 53b are provided on one side of the frame body 37 of the casing 33. The upper water collecting pipe 55a and the upper water intake nozzle 53a are connected via the connection pipe 56 and the lower water collecting pipe 55b and the lower water intake nozzle 53b are connected via the connection pipe 56.

Both the side covers 39a and 39b are respectively divided vertically into two as an upper side cover body 97 and a lower side cover body 98. The upper and lower side cover bodies 97 and 98 are respectively detachably attached to the frame body 37 by the bolts 46.

Consequently, during filtration operation, the inner side of the membrane cartridges 34 is decompressed while air diffusion is performed from an air diffuser 36, whereby sludge or the like in the liquid to be treated is caught by the filtration membranes 50 of the membrane cartridge 34. Permeate permeating through the filtration membranes 50 and flowing into the inner side of the membrane cartridges 34 is collected in the water collecting pipes 55a and 55b from the water intake nozzles 53a and 53b through the connection pipes 56.

In this case, the upflow 77 is generated between the membrane cartridges 34 by air bubbles of the air diffused from the air diffuser 36. The matter adhering to the membrane surface of the membrane cartridges 34 is removed by the upflow 77.

The upper water intake nozzle 53a is provided at the upper end of the upper portion 91 and the lower water intake nozzles 53b is provided at the upper end of the lower portion 92. Therefore, it is possible to surely collect treated water from the entire area in the portions 91 and 92 and prevent air pocket from occurring in the portions 91 and 92.

Figure 25A:
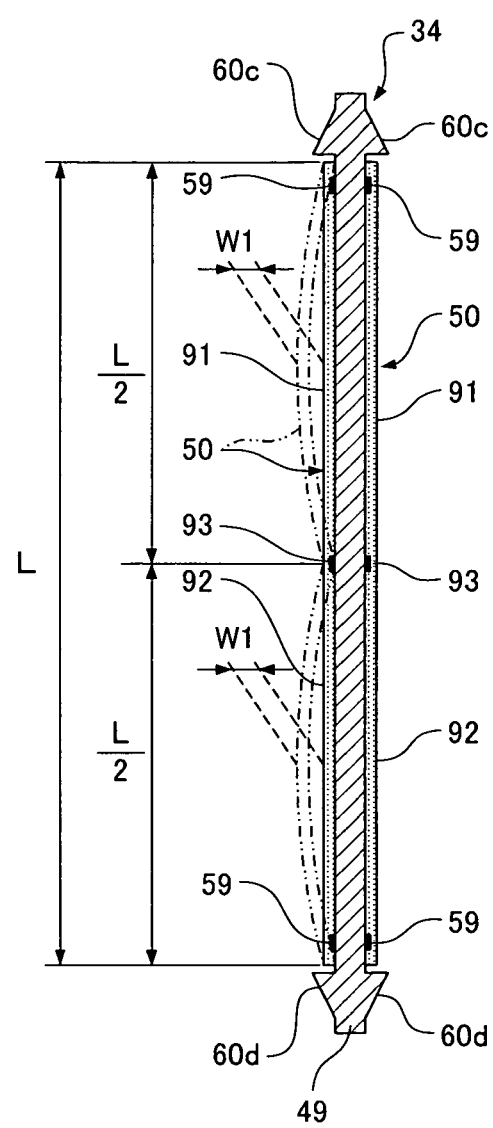
FIG. 25A is a longitudinal sectional view of the membrane cartridge of the submerged membrane separator in the fourteenth embodiment and shows the membrane cartridge in which a filtration membrane is divided into upper and lower two portions.
Figure 25B:
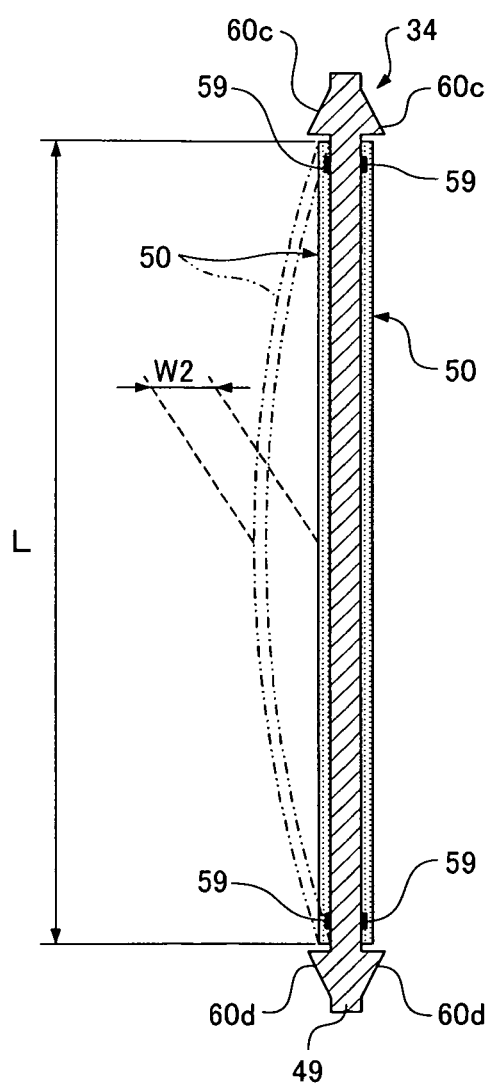
FIG. 25B is a longitudinal sectional view of the membrane cartridge of the submerged membrane separator in the fourteenth embodiment and shows the membrane cartridge in which the filtration membrane is not divided.

When the upflow 77 flows along the filtration membrane 50, the filtration membrane 50 vibrates in the thickness direction with respect to the filtration plate 49 because of the force of the upflow 77. As shown in FIG. 25A, the height L of the filtration membrane 50 is divided short into upper and lower half heights (=L/2) by the portions 91 and 92. Therefore, as shown in FIG. 25B, width W1 of vibration of the filtration membrane 50 vibrating in the thickness direction in each of the portions 91 and 92 is small compared with width W2 of vibration of the filtration membrane 50, in which the portions 91 and 92 are not formed as shown in FIG. 25B, vibrating in the thickness direction (W1<W2). Consequently, it is possible to prevent the filtration membrane 50 from being damaged and extend the life of the filtration membrane 50. Imaginary lines in FIGS. 25A and 25B exaggeratedly indicate a state in which the filtration membrane 50 vibrates. Actually, the widths W1 and W2 of the vibration of the filtration membrane 50 are extremely small.

Figure 24:
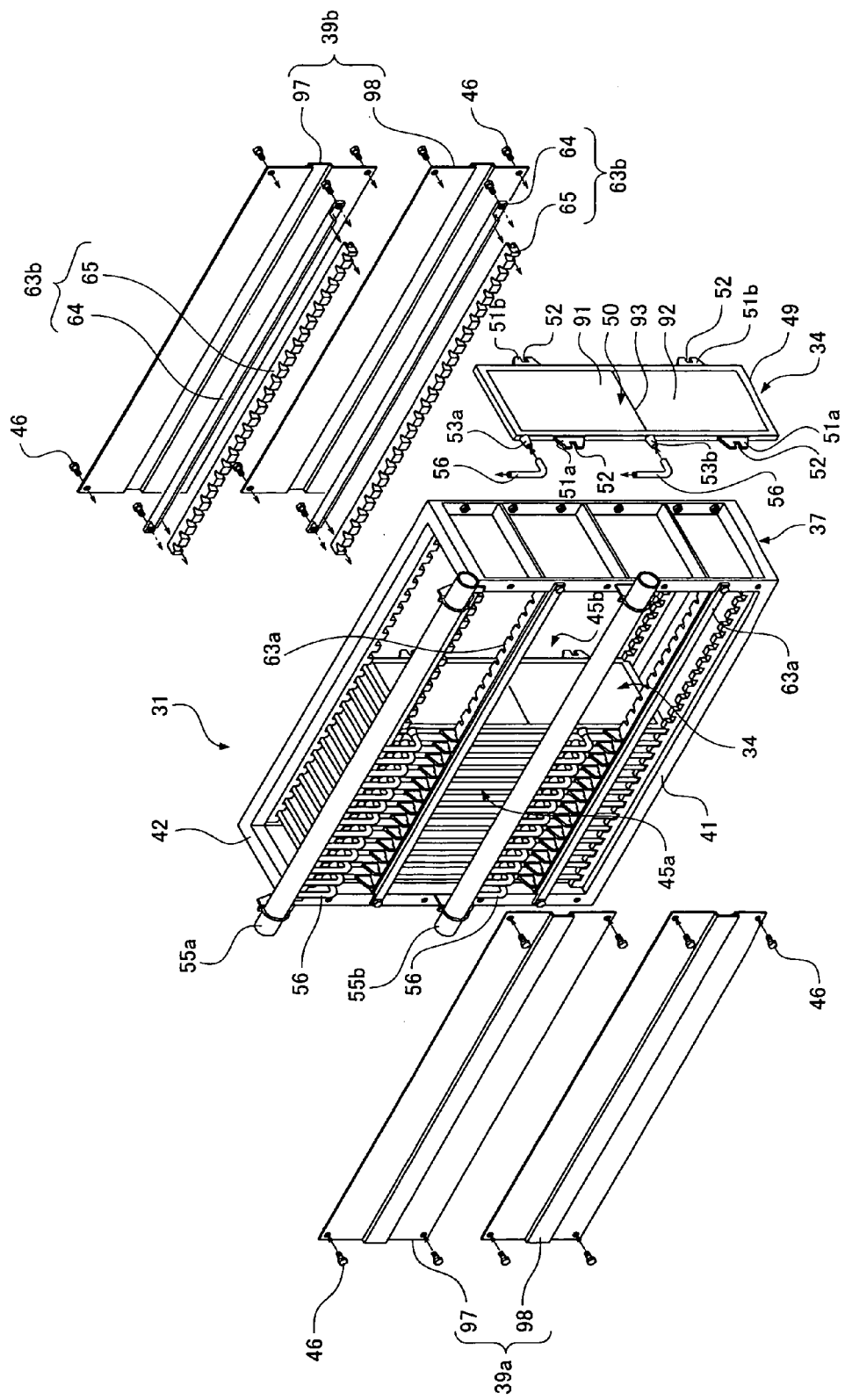
FIG. 24 is a disassembled perspective view showing the configuration of the submerged membrane separator in the fourteenth embodiment.

When the high-pressure cleaning liquid 75 is jetted from the injection nozzle 76 to clean the membrane cartridges 34, as shown in FIG. 24, the bolts 46 are unscrewed to remove the upper side cover body 97 and the lower side cover body 98 of one side cover 39a from the frame body 37 and open one side opening 45a and the high-pressure cleaning liquid 75 is jetted from one side opening 45a to the membrane cartridges 34. Alternatively, it is also possible that the upper side cover body 97 and the lower side cover body 98 of the other side cover 39b are removed from the frame body 37 to open the other side opening 45b and the high-pressure cleaning liquid 75 is jetted from the other side opening 45b to the membrane cartridges 34.

In the fourteenth embodiment, the filtration membrane 50 is divided into the two portions 91 and 92 by welding the vertical center of the filtration membrane 50 to the filtration plate 49 over the entire width. However, the filtration membrane 50 may be divided into the two portions 91 and 92 by providing ribs in the filtration plate 49.

Figure 23:
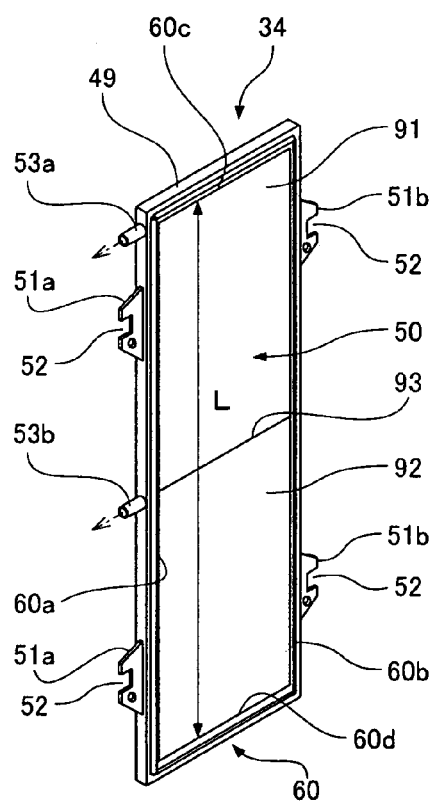
FIG. 23 is a perspective view of a membrane cartridge of a submerged membrane separator in a fourteenth embodiment of the present invention.
Figure 26:
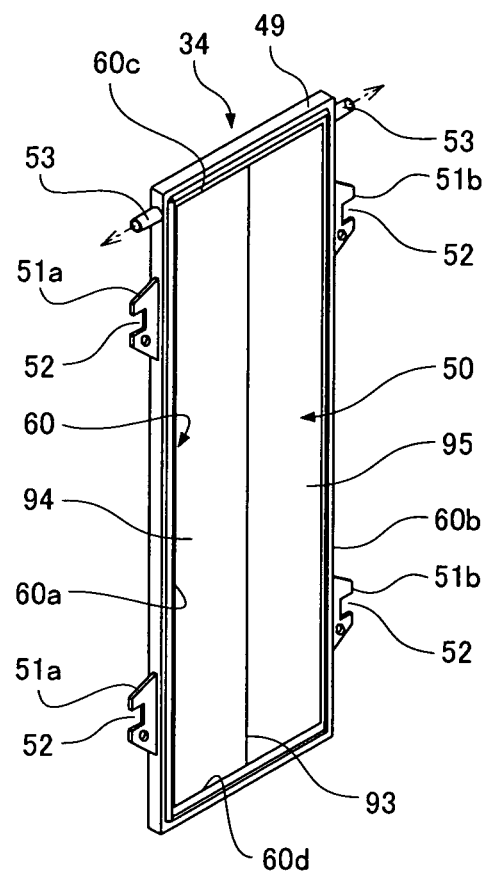
FIG. 26 is a perspective view of a membrane cartridge of a submerged membrane separator in a fifteenth embodiment of the present invention.
Figure 27A:
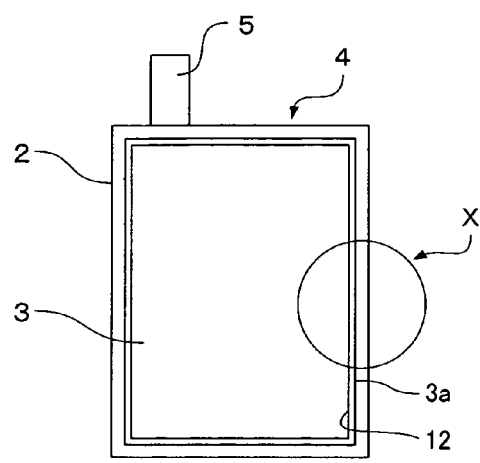
FIG. 27A is a front view of a membrane cartridge provided in a submerged membrane separator in a prior art.
Figure 27B:
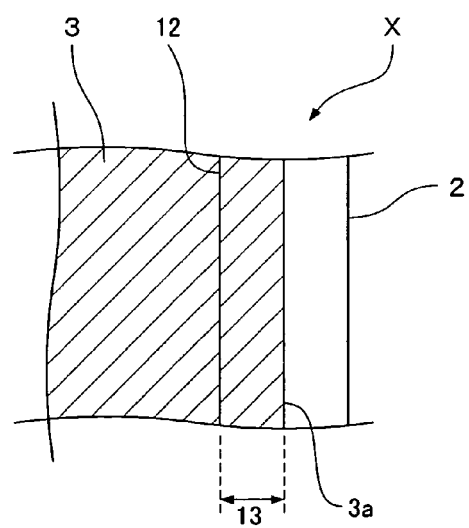
FIG. 27B is an enlarged view in an X portion in FIG. 27A.

In the fourteenth embodiment, as shown in FIG. 23, the filtration membrane 50 is divided into the upper and lower two portions 91 and 92. However, the filtration membrane 50 may be divided into upper and lower three or more portions. As a fifth embodiment, as shown in FIG. 26, the filtration membrane 50 may be divided into left and right two portions 94 and 95 or may be divided into left and right three or more portions.

Figure 28:
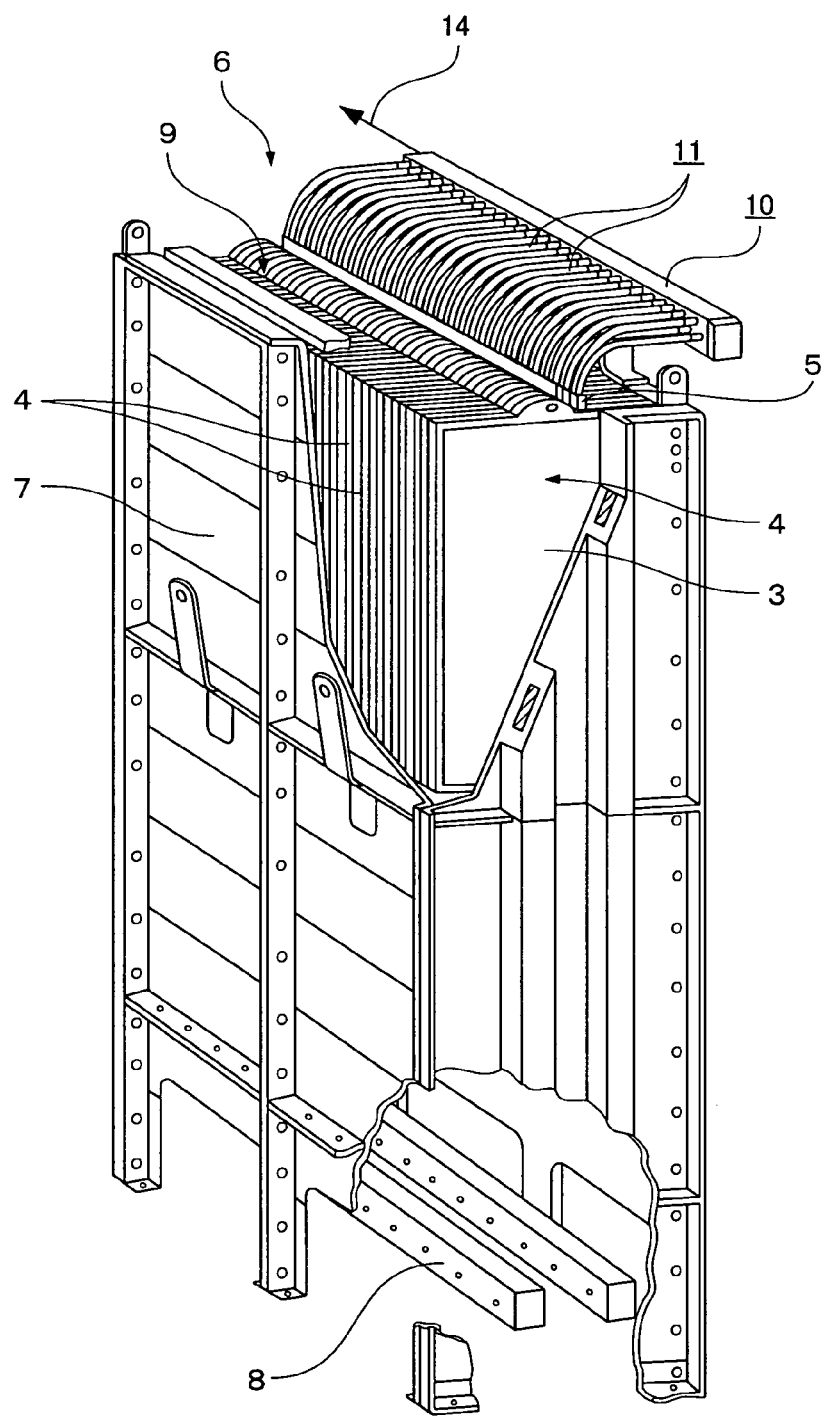
FIG. 28 is a partially cutout perspective view of the submerged membrane separator including membrane cartridges in the prior art.
Figure 29:
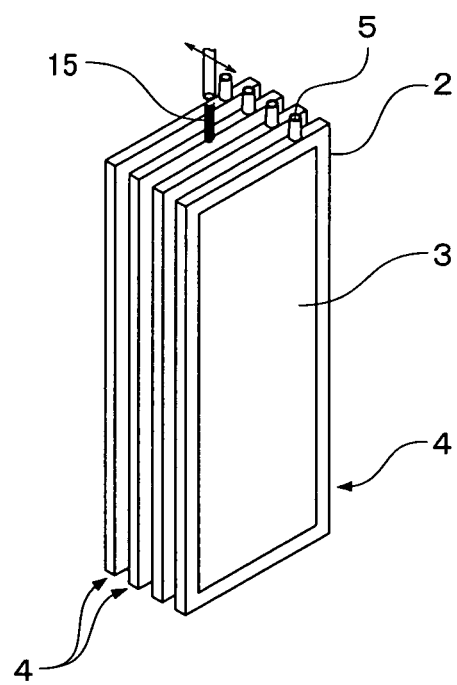
FIG. 29 is a perspective view showing a method of jetting cleaning liquid on and cleaning the membrane cartridges of the submerged membrane separator in the prior art.
Figure 30A:
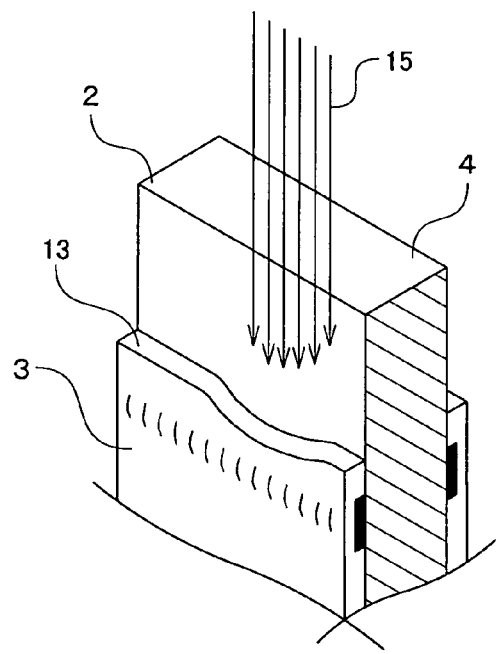
FIG. 30A shows a state in which the cleaning liquid directly hits against the edge of a filtration membrane when the cleaning liquid is jetted on the membrane cartridge of the submerged membrane separator in the prior art.
Figure 30B:
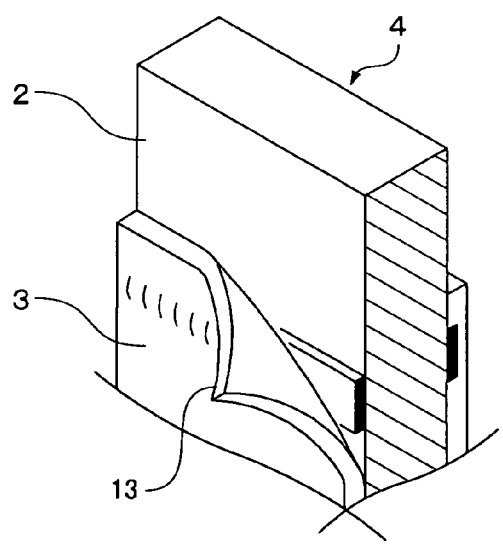
FIG. 30B shows a state in which the edge of the filtration membrane peels from a filtration plate when the cleaning liquid is jetted on the membrane cartridge of the submerged membrane separator in the prior art.

In the embodiments, the submerged membrane separator 31 having the structure in which the membrane cartridges 34 can be removed and inserted from the horizontal direction of the casing 33 is explained as an example. However, the membrane cartridges 34 according to the embodiments may be used in a submerged membrane separator in the prior art having a structure in which membrane cartridges can be removed and inserted from an upper part of a casing as shown in FIG. 28. Further, a plurality of the membrane cartridges 34 including the filtration membranes 50 arranged on the surfaces of the filtration plates 49 may be integrally configured as a module. In this case, the respective filtration plates 49 are not limited to detachably attachable filtration plates.

The invention claimed is:

1. A membrane cartridge arrayed in a casing of a submerged membrane separator and submerged in liquid to be treated, wherein
a peripheral portion of a filtration membrane is joined to a surface of a filtration plate,
water intake nozzles for sucking permeate permeating through the filtration membrane are provided on upper portions of the filtration plate, and
a projecting portion higher than the surface of the filtration plate corresponding to a peripheral edge of the filtration membrane is continuously formed in a square frame shape on a surface of the filtration plate further on an outer side than the peripheral edge of the filtration membrane.

2. The membrane cartridge according to claim 1, wherein the projecting portion is formed in a square frame shape by a projecting portion on one side, a projecting portion on the other side, an upper projecting portion, and a lower projecting portion, and
a height from the surface of the filtration plate to each of said projecting portions is the same.

3. A membrane cartridge arrayed in a casing of a submerged membrane separator and submerged in liquid to be treated, wherein
a peripheral portion of a filtration membrane is joined to a surface of a filtration plate,
water intake nozzles for sucking permeate permeating through the filtration membrane are provided on upper portions of the filtration plate, and
projecting portions higher than the surface of the filtration plate corresponding to a peripheral edge of the filtration membrane are intermittently formed in a square frame shape on the surface of the filtration plate, and a proportion of spaces in a formation area of the projecting portions of each side of the projecting portions formed in a square frame shape is set to be equal to or smaller than 50%.

4. The membrane cartridge according to claim 3, wherein the projecting portion is formed in a square frame shape by a projecting portion on one side, a projecting portion on the other side, an upper projecting portion, and a lower projecting portion, and
a height from the surface of the filtration plate to each of said projecting portions is the same.

5. A membrane cartridge arrayed in a casing of a submerged membrane separator and submerged in liquid to be treated, wherein
a peripheral portion of a filtration membrane is joined to a surface of a filtration plate,
water intake nozzles for sucking permeate permeating through the filtration membrane are provided on upper portions of the filtration plate,
a recess is continuously formed in a square frame shape on a surface of the filtration plate,
the recess is lower than a surface of the peripheral portion of the filtration plate further on an outer side than the recess, and
a peripheral edge of the filtration membrane is located in the recess.

6. A membrane cartridge arrayed in a casing of a submerged membrane separator and submerged in liquid to be treated, wherein
a peripheral portion of a filtration membrane is joined to a surface of a filtration plate,
water intake nozzles for sucking permeate permeating through the filtration membrane are provided on upper portions of the filtration plate,
a projecting portion higher than the surface of the filtration plate corresponding to a peripheral edge of the filtration membrane is continuously formed on the surface of the filtration plate, and
the projecting portion is formed along an outer side of an upper side of the filtration membrane in an up-down direction of the membrane cartridge arrayed in the casing.

7. A membrane cartridge arrayed in a casing of a submerged membrane separator and submerged in liquid to be treated, wherein
a peripheral portion of a filtration membrane is joined to a surface of a filtration plate, water intake nozzles for sucking permeate permeating through the filtration membrane are provided on upper portions of the filtration plate, projecting portions higher than the surface of the filtration plate corresponding to a peripheral edge of the filtration membrane are intermittently formed on the surface of the filtration plate, the projecting portions are formed along an outer side of, and right above, an upper side of the filtration membrane in an up-down direction of the membrane cartridge arrayed in the casing, and a proportion of spaces in a formation area of the projection portions formed along the outer side of, and right above, the upper side of the filtration membrane is set to be equal to or smaller than 50%.

* * * * *